United States Patent
Ihara et al.

(10) Patent No.: US 9,935,336 B2
(45) Date of Patent: Apr. 3, 2018

(54) SECONDARY BATTERY, BATTERY PACK, ELECTRIC VEHICLE, AND ELECTRIC POWER STORAGE SYSTEM

(71) Applicant: Sony Corporation, Tokyo (JP)

(72) Inventors: Masayuki Ihara, Fukushima (JP); Shigeru Fujita, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 278 days.

(21) Appl. No.: 14/535,594

(22) Filed: Nov. 7, 2014

(65) Prior Publication Data
US 2015/0140421 A1    May 21, 2015

(30) Foreign Application Priority Data
Nov. 21, 2013    (JP) ................. 2013-240695

(51) Int. Cl.
*H01M 10/0568*    (2010.01)
*H01M 10/0569*    (2010.01)
(Continued)

(52) U.S. Cl.
CPC ....... *H01M 10/0568* (2013.01); *B60L 3/0046* (2013.01); *B60L 3/12* (2013.01); *B60L 11/14* (2013.01); *B60L 11/1859* (2013.01); *B60L 11/1861* (2013.01); *B60L 11/1872* (2013.01); *B60L 11/1879* (2013.01); *H01M 4/505* (2013.01); *H01M 4/525* (2013.01); *H01M 10/0525* (2013.01); *H01M 10/0569* (2013.01); *B60L 2230/22* (2013.01); *B60L 2230/24* (2013.01); *B60L 2240/36* (2013.01); *B60L 2240/545* (2013.01); *B60L 2240/547* (2013.01); *B60L 2240/549* (2013.01); *B60L 2240/662* (2013.01); *H01M 4/587* (2013.01); *H01M 2220/20* (2013.01); *H01M 2220/30* (2013.01); *H01M 2300/004* (2013.01); *H01M 2300/0037* (2013.01); *Y02E 60/122* (2013.01);
(Continued)

(58) Field of Classification Search
CPC ......... H01M 10/0568; H01M 10/0525; H01M 10/0569; H01M 4/587; H01M 4/505; H01M 4/525
USPC ......................................................... 429/199
See application file for complete search history.

(56) References Cited

U.S. PATENT DOCUMENTS

| | | | | |
|---|---|---|---|---|
| 2012/0309982 A1* | 12/2012 | Shinohara | ................. | C07F 5/02 548/110 |
| 2013/0052524 A1* | 2/2013 | Yamada | .............. | H01M 10/052 429/200 |
| 2013/0295449 A1* | 11/2013 | Kobatake | ............... | H01G 11/62 429/200 |

FOREIGN PATENT DOCUMENTS

| | | |
|---|---|---|
| JP | 2006-517546 | 7/2006 |
| JP | 2009-527074 | 7/2009 |

(Continued)

*Primary Examiner* — Osei Amponsah
(74) *Attorney, Agent, or Firm* — K&L Gates LLP

(57) ABSTRACT

A secondary battery includes: a cathode including a lithium-oxygen-containing compound; an anode; and non-aqueous electrolytic solution including one or more first anions represented by Formula (1).

$$B(XY)_xF_yR_z^- \qquad (1)$$

where X is one of a divalent chain hydrocarbon group, a divalent fluorinated chain hydrocarbon group, and nothing; Y is one of a cyano group (—C≡N) and an isocyano group (—N+≡C—); R is one of a monovalent fluorinated chain hydrocarbon group and a monovalent fluorinated cyclic hydrocarbon group; and x to z are integers that satisfy $x>0$, $y≥0$, $z≥0$, $(x+y+z)=4$, and $(y+z)>0$.

17 Claims, 6 Drawing Sheets

(51) Int. Cl.
- *H01M 4/525* (2010.01)
- *H01M 4/587* (2010.01)
- *B60L 11/18* (2006.01)
- *B60L 3/00* (2006.01)
- *B60L 3/12* (2006.01)
- *B60L 11/14* (2006.01)
- *H01M 4/505* (2010.01)
- *H01M 10/0525* (2010.01)

(52) U.S. Cl.
CPC .............. *Y02T 10/70* (2013.01); *Y02T 10/705* (2013.01); *Y02T 10/7011* (2013.01); *Y02T 10/7044* (2013.01); *Y02T 10/7077* (2013.01); *Y02T 10/7088* (2013.01); *Y02T 10/7291* (2013.01); *Y02T 90/12* (2013.01); *Y02T 90/16* (2013.01)

(56) References Cited

FOREIGN PATENT DOCUMENTS

| | | |
|---|---|---|
| JP | 2010-013433 | 1/2010 |
| JP | 2011-142073 | 7/2011 |
| JP | 2011-524342 | 9/2011 |
| JP | 2011-246443 | 12/2011 |
| JP | 2012-216419 | 11/2012 |
| JP | 2013-045887 | 3/2013 |
| JP | 2013-067601 | 4/2013 |
| WO | 2010-021391 | 2/2010 |

\* cited by examiner

SECONDARY BATTERY, BATTERY PACK, ELECTRIC VEHICLE, AND ELECTRIC POWER STORAGE SYSTEM

CROSS REFERENCES TO RELATED APPLICATIONS

The present application claims priority to Japanese Priority Patent Application JP 2013-240695 filed in the Japan Patent Office on Nov. 21, 2013, the entire content of which is hereby incorporated by reference.

BACKGROUND

The present application relates to a secondary battery that includes a cathode, an anode, and non-aqueous electrolytic solution, and to a battery pack, an electric vehicle, and an electric power storage system that use the secondary battery.

In recent years, various electronic apparatuses such as a mobile phone and a mobile information terminal device (a PDA) have been widely used, and it has been demanded to further reduce the size and the weight of the electronic apparatuses and to achieve their longer life. Accordingly, as an electric power source, a battery, in particular, a small and light-weight secondary battery capable of providing high energy density has been developed.

In these days, it has been considered to apply a secondary battery to various other applications in addition to the foregoing electronic apparatuses. Examples of such other applications may include a battery pack attachably and detachably mounted on the electronic apparatuses or the like, an electric vehicle such as an electric automobile, and an electric power storage system such as a home electric power server.

There have been proposed secondary batteries that utilize various charge and discharge principles in order to obtain battery capacity. In particular, attention has been paid to a secondary battery that obtains battery capacity utilizing insertion and extraction or precipitation and dissolution of an electrode reactant. One reason for this is because higher energy density is achieved in such secondary batteries than in a lead battery, a nickel-cadmium battery, etc.

A secondary battery includes a cathode, an anode, and a liquid electrolyte (electrolytic solution). The electrolytic solution includes a solvent and an electrolyte salt. A composition of the electrolytic solution that serves as a medium in charge and discharge reactions largely influences a performance of the secondary battery. Various considerations are therefore made on the composition of the electrolytic solution.

Specifically, in order to suppress degradation in characteristics of an electrochemical device resulting from hydrogen fluoride generated by a decomposition reaction of an electrolyte, an anion component in the electrolyte includes a boron-containing anion (for example, see Japanese Unexamined Patent Application Publication No. 2013-045887).

SUMMARY

An electronic apparatus, etc. have been gaining higher performance and more functions. In accordance therewith, frequency in use of the electronic apparatus, etc. has increased, which results in a tendency of frequent charge and discharge of a secondary battery under various conditions. Moreover, the electronic apparatus, etc. are used under various environments, which results in a tendency that the secondary battery is exposed to various temperature environments. Accordingly, there is still a room for improvement in performance of the secondary battery.

It is desirable to provide a secondary battery, a battery pack, an electric vehicle, and an electric power storage system that are capable of achieving superior battery characteristics.

According to an embodiment of the present application, there is provided a secondary battery including: a cathode including a lithium-oxygen-containing compound; an anode; and non-aqueous electrolytic solution including one or more first anions represented by Formula (1).

$$B(XY)_xF_yR_z^-  \quad (1)$$

(X is one of a divalent chain hydrocarbon group, a divalent fluorinated chain hydrocarbon group, and nothing. Y is one of a cyano group (—C≡N) and an isocyano group (—N$^+$≡C$^-$). R is one of a monovalent fluorinated chain hydrocarbon group and a monovalent fluorinated cyclic hydrocarbon group. x to z are integers that satisfy x>0, y≥0, z≥0, (x+y+z)=4, and (y+z)>0.)

According to an embodiment of the present application, there is provided a battery pack including: a secondary battery; a control section configured to control operation of the secondary battery; and a switch section configured to switch the operation of the secondary battery according to an instruction of the control section. The secondary battery includes: a cathode including a lithium-oxygen-containing compound; an anode; and non-aqueous electrolytic solution including one or more first anions represented by Formula (1).

$$B(XY)_xF_yR_z^-  \quad (1)$$

(X is one of a divalent chain hydrocarbon group, a divalent fluorinated chain hydrocarbon group, and nothing. Y is one of a cyano group (—C≡N) and an isocyano group (—N$^+$≡C$^-$). R is one of a monovalent fluorinated chain hydrocarbon group and a monovalent fluorinated cyclic hydrocarbon group. x to z are integers that satisfy x>0, y≥0, z≥0, (x+y+z)=4, and (y+z)>0.)

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery. The secondary battery includes: a cathode including a lithium-oxygen-containing compound; an anode; and non-aqueous electrolytic solution including one or more first anions represented by Formula (1).

$$B(XY)_xF_yR_z^-  \quad (1)$$

(X is one of a divalent chain hydrocarbon group, a divalent fluorinated chain hydrocarbon group, and nothing. Y is one of a cyano group (—C≡N) and an isocyano group (—N$^+$≡C$^-$). R is one of a monovalent fluorinated chain hydrocarbon group and a monovalent fluorinated cyclic hydrocarbon group. x to z are integers that satisfy x>0, y≥0, z≥0, (x+y+z)=4, and (y+z)>0.)

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices. The secondary battery includes: a cathode including a lithium-oxygen-containing compound; an anode; and non-aqueous electrolytic solution including one or more first anions represented by Formula (1).

$$B(XY)_xF_yR_z^-\qquad(1)$$

(X is one of a divalent chain hydrocarbon group, a divalent fluorinated chain hydrocarbon group, and nothing. Y is one of a cyano group (—C≡N) and an isocyano group (—N$^+$≡C$^-$). R is one of a monovalent fluorinated chain hydrocarbon group and a monovalent fluorinated cyclic hydrocarbon group. x to z are integers that satisfy x>0, y≥0, z≥0, (x+y+z)=4, and (y+z)>0.)

According to the secondary battery of the embodiment of the present application, the cathode includes the lithium-oxygen-containing compound, and the non-aqueous electrolytic solution includes one or more first anions represented by Formula (1), and superior battery characteristics are therefore achieved. Moreover, a similar effect is achieved also by the battery pack, the electric vehicle, or the electric power storage system of the embodiment of the present application.

It is to be noted that the effects of the present application are not limited to the effects described herein and may be any of the effects described in the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present application are described below in detail with reference to the drawings. The description is provided in the following order.

1. Secondary Battery
  1-1. Lithium Ion Secondary Battery (Cylindrical Type)
  1-2. Lithium Ion Secondary Battery (Laminated Film Type)
  1-3. Lithium Metal Secondary Battery (Cylindrical Type and Laminated Film Type)
2. Applications of Secondary Battery
  2-1. Battery Pack
  2-2. Electric Vehicle
  2-3. Electric Power Storage System
  2-4. Electric Power Tool

[1. Secondary Battery]

First, a secondary battery according to an embodiment of the present application (hereinafter, may be simply referred to as "secondary battery" or "secondary battery of the present application") is described.

[1-1. Lithium Ion Secondary Battery (Cylindrical Type)]

Figure 1:
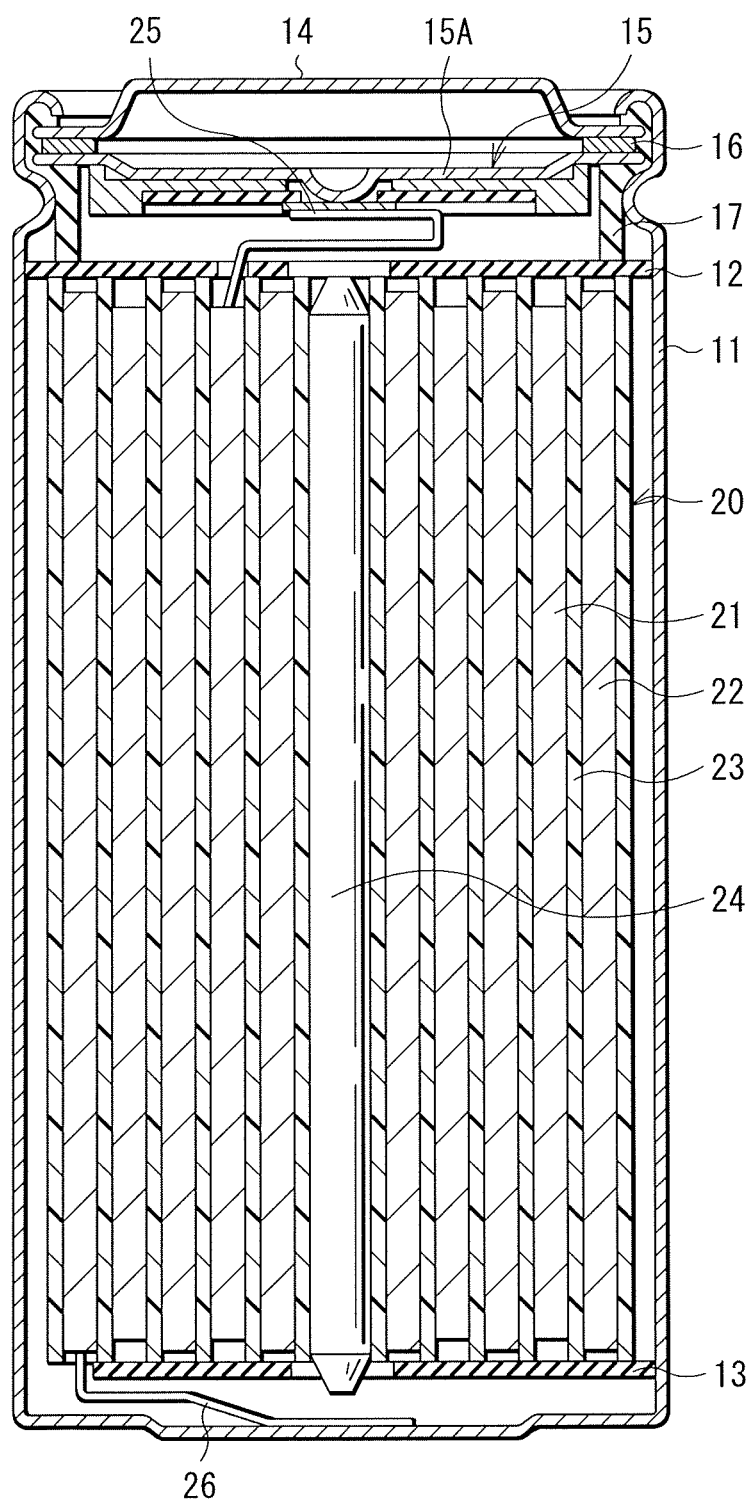
FIG. 1 is a cross-sectional view illustrating a configuration of a secondary battery (of a cylindrical type) that uses non-aqueous electrolytic solution of an embodiment of the present application.
Figure 2:
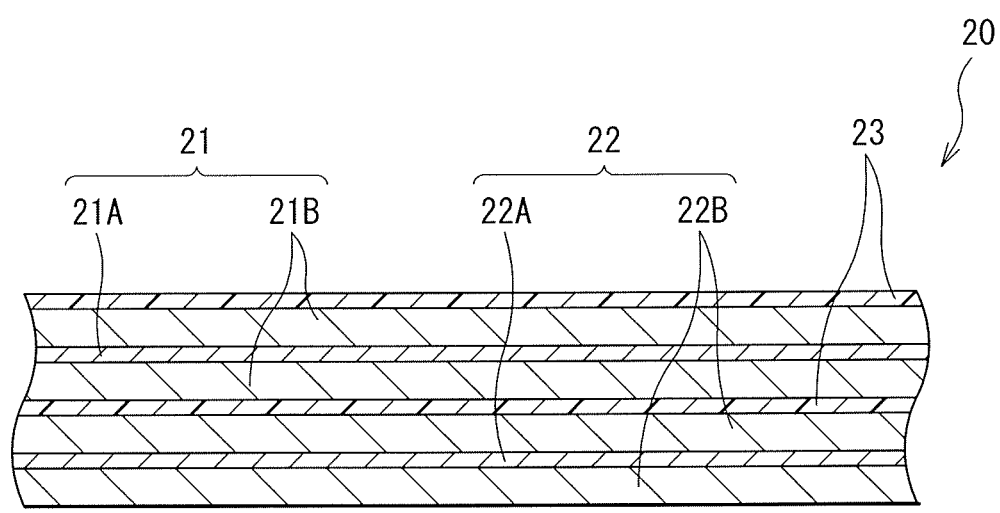
FIG. 2 is a cross-sectional view illustrating an enlarged part of a spirally wound electrode body illustrated in FIG. 1.

FIG. 1 and FIG. 2 each illustrate a cross-sectional configuration of the secondary battery. FIG. 2 illustrates an enlarged part of a spirally wound electrode body 20 illustrated in FIG. 1.

[General Configuration of Secondary Battery]

The secondary battery described here is a lithium secondary battery (a lithium ion secondary battery) in which capacity of an anode 22 is obtained by insertion and extraction of lithium (Li) as an electrode reactant.

The secondary battery may contain a pair of insulating plates 12 and 13 and a spirally wound electrode body 20 inside a battery can 11. A form of the secondary battery that uses the battery can 11 is called a cylindrical type.

The battery can 11 is an outer package that contains the spirally wound electrode body 20, etc. The battery can 11 may have an almost hollow shape. More specifically, the battery can 11 has a hollow structure in which one end of the battery can 11 is closed and the other end of the battery can 11 is opened. The battery can 11 may be made, for example, of one or more of iron (Fe), aluminum (Al), alloy thereof, and the like. The surface of the battery can 11 may be plated with a metal material such as nickel (Ni). The pair of insulating plates 12 and 13 is arranged to extend perpendicularly to the spirally wound periphery surface of the spirally wound electrode body 20, and to sandwich the spirally wound electrode body 20 in between.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to that of the battery can 11. The safety valve mechanism 15 blocks a current depending on an internal pressure of the battery can 11. More specifically, when the internal pressure of the battery can 11 increases to a certain level or higher, the safety valve mechanism 15 inverts a disk plate 15A, and thereby cuts electric connection between the battery cover 14 and the spirally wound electrode body 20. Thus, defaults such as heat generation or ignition are made less likely to be caused. A reason by which the internal pressure of the battery can 11 increases may be, for example, internal short circuit, heating, or the like of the secondary battery. The PTC device 16 prevents abnormal heat generation resulting from a large current. As temperature rises, resistance of the PTC device 16 is increased accordingly. The gasket 17 may be made, for example, of an insulating material. The surface of the gasket 17 may be coated with asphalt.

The spirally wound electrode body 20 may include, for example, a cathode 21 and an anode 22 that face each other with a separator 23 in between, which are spirally wound. In the center of the spirally wound electrode body 20, for example, a center pin 24 may be inserted. However, the center pin 24 may not be provided.

For example, a cathode lead 25 made of one or more of conductive materials such as aluminum may be connected to the cathode 21. For example, an anode lead 26 made of one or more of conductive materials such as nickel may be connected to the anode 22. The cathode lead 25 may be connected to the safety valve mechanism 15, and may be electrically connected to the battery cover 14. The anode lead 26 may be connected to the battery can 11, and may be therefore electrically connected to the battery can 11. The connecting method used for each of the cathode lead 25 and the anode lead 26 may be, for example, a welding method or the like.

[Cathode]

The cathode 21 has a cathode active material layer 21B on one surface or both surfaces of a cathode current collector 21A.

The cathode current collector 21A may be made, for example, of a conductive material such as aluminum, nickel, or stainless steel.

The cathode active material layer 21B includes, as a cathode active material, one or more of cathode materials capable of inserting and extracting lithium. It is to be noted that the cathode active material layer 21B may further include one or more of other materials such as a cathode binder and a cathode electric conductor.

The cathode material may include a lithium-oxygen-containing compound, because high energy density is achieved thereby. "Lithium-oxygen-containing compound" is a compound that includes lithium and oxygen (O) as constituent elements. More specifically, the lithium-oxygen-containing compound may include, for example, one or more of elements belonging to Groups 2 to 15 in the long form of the periodic table as constituent element, together with lithium and oxygen. The kind of "element" is not particularly limited as long as the kind of "element" is one or more of elements belonging to Groups 2 to 15 in the long form of the periodic table.

In particular, the lithium-oxygen-containing compound may preferably include one or more of compounds represented by respective Formulas (11) to (15), because such compounds are easily manufactured or easily available, and achieves higher energy density.

$$\text{Li}_{a1}\text{Mn}_{(1-b1-c1)}\text{Ni}_{b1}\text{M1}_{c1}\text{O}_{(2-d1)}\text{F}_{e1} \quad (11)$$

(M1 is one or more of cobalt (Co), magnesium (Mg), aluminum, boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a1 to e1 satisfy 0.8≤a1≤1.2, 0<b1<0.5, 0≤c1≤0.5, (b1+c1)<1, −0.1≤d1≤0.2, and 0≤e1≤0.1. A composition of lithium differs depending on a charged-discharged state, and a1 is a value in a completely-discharged state.)

$$\text{Li}_{a2}\text{Ni}_{(1-b2)}\text{M2}_{b2}\text{O}_{(2-c2)}\text{F}_{d2} \quad (12)$$

(M2 is one or more of cobalt, manganese (Mn), magnesium, aluminum, boron, titanium, vanadium, chromium, iron, copper, zinc, molybdenum, tin, calcium, strontium, and tungsten. a2 to d2 satisfy 0.8≤a2≤1.2, 0.005≤b2≤0.5, −0.1≤c2≤0.2, and 0≤d2≤0.1. A composition of lithium differs depending on the charged-discharged state, and a2 is a value in the completely-discharged state.)

$$\text{Li}_{a3}\text{CO}_{(1-b3)}\text{M3}_{b3}\text{O}_{(2-c3)}\text{F}_{d3} \quad (13)$$

(M3 is one or more of nickel (Ni), manganese, magnesium, aluminum, boron, titanium, vanadium, chromium, iron, copper, zinc, molybdenum, tin, calcium, strontium, and tungsten. a3 to d3 satisfy 0.8≤a3≤1.2, 0≤b3<0.5, −0.1≤c3≤0.2, and 0≤d3≤0.1. A composition of lithium differs depending on the charged-discharged state, and a3 is a value in the completely-discharged state.)

$$\text{Li}_{a4}\text{Mn}_{(2-b4)}\text{M4}_{b4}\text{O}_{c4}\text{F}_{d4} \quad (14)$$

(M4 is one or more of cobalt, nickel, magnesium, aluminum, boron, titanium, vanadium, chromium, iron, copper, zinc, molybdenum, tin, calcium, strontium, and tungsten. a4 to d4 satisfy 0.9≤a4≤1.1, 0≤b4≤0.6, 3.7≤c4≤4.1, and 0≤d4≤0.1. A composition of lithium differs depending on the charged-discharged state, and a4 is a value in the completely-discharged state.)

$$\text{Li}_{a5}\text{M5PO}_4 \quad (15)$$

(M5 is one or more of cobalt, manganese, iron, nickel, magnesium, aluminum, boron, titanium, vanadium, niobium (Nb), copper, zinc, molybdenum, calcium, strontium, tungsten, and zirconium (Zr). a5 satisfies 0.9≤a5≤1.1. A composition of lithium differs depending on the charged-discharged state, and a5 is a value in the completely-discharged state.)

The compounds represented by respective Formulas (11) to (13) are each a compound that has a so-called bedded-salt-type crystal structure.

The compound represented by Formula (11) is a lithium composite oxide that includes nickel and manganese, and may include other element (M1) and fluorine (F) as necessary, as constituent elements.

As can be clearly seen from a possible range of a value of a1, the value of a1 that represents an atomic ratio of lithium may be larger than 1. In other words, the lithium composite oxide may be, as it is called, lithium rich.

As can be clearly seen from possible ranges of values of b1 and c1, the lithium composite oxide necessarily includes nickel and manganese as constituent elements. On the other hand, the lithium composite oxide may include other element (M1) as a constituent element, or may not include other element (M1). This is similarly applicable to fluorine.

The kind of M1 is not particularly limited as long as the kind of M1 is one or more of the above-described elements such as cobalt. In particular, M1 may preferably include one or more of transition metal elements, because higher energy density is achieved thereby. Examples of the transition metal elements may include cobalt and iron.

The compound represented by Formula (12) is a lithium composite oxide that includes nickel, and may include other element (M2) and fluorine as necessary, as constituent elements. The details of a2 are similar to the details of a1 described above.

As can be clearly seen from possible ranges of values of b2 and c2, the lithium composite oxide necessarily includes nickel and other element (M2) as constituent elements. On the other hand, the lithium composite oxide may include fluorine as a constituent element, or may not include fluorine.

The kind of M2 is not particularly limited as long as the kind of M2 is one or more of the above-described elements such as cobalt. The details of M2 other than this are similar to the details of M1.

The compound represented by Formula (13) is a lithium composite oxide that includes cobalt, and may include other element (M3) and fluorine as necessary, as constituent elements. The details of a3 are similar to the details of a1 described above.

As can be clearly seen from possible ranges of values of b3 and c3, the lithium composite oxide necessarily includes cobalt as a constituent element. On the other hand, the lithium composite oxide may include other element (M3) as a constituent element, or may not include other element (M3). This is similarly applicable to fluorine.

The kind of M3 is not particularly limited as long as the kind of M3 is one or more of the above-described elements such as nickel. The details of M3 other than this are similar to the details of M1.

Other than the above, the compound that has the bedded-salt-type crystal structure may be, for example, one or more of compounds represented by Formula (30), because such compounds are easily manufactured or easily available, and achieves higher energy density. It is to be noted that the compounds represented by respective Formulas (11) to (13) are excluded from the compound represented by Formula (30).

$$Li_{a6}Ni_{(1-b6-c6)}Mn_{b6}M10_{c6}O_{(2-d6)}X_{e6} \qquad (30)$$

(M10 is one or more of elements belonging to Groups 2 to 15 (excluding nickel and manganese) in the long form of the periodic table. X is one or more of elements belonging to Groups 16 and 17 (excluding oxygen) in the long form of the periodic table. a6 to e6 satisfy $0 \le a6 \le 1.5$, $0 \le b6 \le 1$, $0 \le c6 \le 1$, $-0.1 \le d6 \le 0.2$, and $0 \le e6 \le 0.2$.)

M10 may be, for example, one or more of cobalt, magnesium, aluminum, boron, titanium, vanadium, chromium, iron, copper, zinc, zirconium, molybdenum, tin, calcium, strontium, tungsten, and the like. X may be, for example, one or more of fluorine and the like.

Specific examples of the compounds represented by respective Formulas (11) to (13) and (30) may be one or more of $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and the like.

The compound represented by Formula (14) is a compound that has a so-called spinel crystal structure. More specifically, the compound represented by Formula (14) is a lithium composite oxide that includes manganese, and may include other element (M4) and fluorine as necessary, as constituent elements. The details of a4 are similar to the details of a1 described above.

As can be clearly seen from a possible range of a value of b4, the lithium composite oxide necessarily includes manganese as a constituent element. On the other hand, the lithium composite oxide may include other element (M4) as a constituent element, or may not include other element (M4). This is similarly applicable to fluorine.

The kind of M4 is not particularly limited as long as the kind of M4 is one or more of the above-described elements such as cobalt. The details of M4 other than this are similar to the details of M1.

A specific example of the compound represented by Formula (14) may be one or more of $LiMn_2O_4$ and the like.

The compound represented by Formula (15) is a compound that has a so-called olivine crystal structure. More specifically, the compound represented by Formula (15) is a lithium phosphate compound that includes other element (M5) as a constituent element. The details of a5 are similar to the details of a1 described above.

The kind of M5 is not particularly limited as long as the kind of M5 is one or more of the above-described elements such as cobalt. The details of M5 other than this are similar to the details of M1.

A specific example of the compound represented by Formula (15) may be one or more of $LiFePO_4$, $LiMnPO_4$, $LiFe_{0.5}Mn_{0.5}PO_4$, $LiFe_{0.3}Mn_{0.7}PO_4$, and the like.

It is to be noted that the cathode material may include, together with the above-described lithium-oxygen-containing compound, one or more of other materials capable of inserting and extracting lithium.

Examples of other materials may include an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene.

The cathode binder may include, for example, one or more of synthetic rubbers, polymer materials, and the like. Examples of the synthetic rubber may include styrene-butadiene-based rubber, fluorine-based rubber, and ethylene propylene diene. Examples of the polymer material may include polyvinylidene fluoride and polyimide. A crystal structure of polyvinylidene fluoride used as the polymer material is not particularly limited.

The cathode electric conductor may include, for example, one or more of carbon materials and the like. Examples of the carbon material may include graphite, carbon black, acetylene black, and Ketjen black. The cathode electric conductor may be a metal material, a conductive polymer, or the like as long as the material has electric conductivity.

[Anode]

The anode 22 has an anode active material layer 22B on one surface or both surfaces of an anode current collector 22A.

The anode current collector 22A may include, for example, one or more of conductive materials such as copper, nickel, and stainless steel. The surface of the anode current collector 22A may be preferably roughened. Thereby, due to a so-called anchor effect, close-attachment characteristics of the anode active material layer 22B with respect to the anode current collector 22A are improved. In this case, it is enough that the surface of the anode current collector 22A in a region opposed to the anode active material layer 22B is roughened at minimum. Examples of roughening methods may include a method of forming fine particles by utilizing an electrolytic treatment. The electrolytic treatment is a method of forming the fine particles on the surface of the anode current collector 22A with the use of an electrolytic method in an electrolytic bath to provide concavities and convexities on the surface of the anode current collector 22A. A copper foil fabricated by an electrolytic method is generally called "electrolytic copper foil."

The anode active material layer 22B includes one or more of anode materials capable of inserting and extracting lithium as anode active materials. However, the anode active material layer 22B may further include one or more of other materials such as an anode binder and an anode electric conductor.

The details of the anode binder and the anode electric conductor may be, for example, similar to the details of the cathode binder and the cathode electric conductor.

However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium may be preferably larger than the electrochemical equivalent of the cathode 21.

The anode material may be, for example, one or more of carbon materials, because, in the carbon material, its crystal structure change at the time of insertion and extraction of lithium is extremely small, and high energy density is stably achieved. Further, the carbon material serves as an anode electric conductor as well, which improves electrical conductivity of the anode active material layer 22B.

Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as phenol resin and furan resin at appropriate temperature. In addition thereto, the carbon material may be low crystalline carbon heat-treated at temperature of about 1000 deg C. or lower, or may be amorphous carbon. It is to be noted that the shape of the carbon material may be any of a fibrous shape, a spherical shape, a granular shape, and a scale-like shape.

Moreover, the anode material may be, for example, a material (a metal-based material) containing one or more of metal elements and metalloid elements as constituent elements, because high energy density is thereby achieved.

The metal-based material may be a simple substance, alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming alloy with lithium. Specific examples thereof may include magnesium, boron, aluminum, gallium, indium (In), silicon, germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable, because silicon and tin have superior ability of inserting and extracting lithium, and therefore achieve high energy density.

A material containing silicon, tin, or both as constituent elements may be any of a simple substance, alloy, and a compound of silicon, may be any of a simple substance, alloy, and a compound of tin, may be two or more thereof, or may have one or more phases thereof in part or all thereof. It is to be noted that "simple substance" described herein merely refers to a simple substance in a general sense (a small amount of impurity may be therein contained), and does not necessarily refer to a purity 100% simple substance.

The alloys of silicon may contain, for example, one or more of elements such as tin, nickel, copper, iron, cobalt, manganese, zinc, indium, silver, titanium, germanium, bismuth, antimony, and chromium, as a constituent element other than silicon. The compound of silicon may contain, for example, one or more of carbon (C), oxygen (O), and the like as constituent elements other than Si. It is to be noted that the compound of silicon may contain, for example, one or more of the series of elements described for the alloys of silicon, as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $CuSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), and $LiSiO$. v in $SiO_v$ may be in a range of $0.2<v<1.4$.

The alloys of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen as constituent elements other than tin. It is to be noted that the compound of tin may contain, for example, one or more of the series of elements described for the alloys of tin, as constituent elements other than tin.

Specific examples of the alloys of tin and the compounds of tin may include $SnO_w$ ($0<w\leq 2$), $SnSiO_3$, $LiSnO$, and $Mg_2Sn$.

In particular, the material containing tin as a constituent element may be preferably, for example, a material containing a second constituent element and a third constituent element in addition to tin (a first constituent element). Examples of the second constituent element may include one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. Examples of the third constituent element may include one or more of elements such as boron, carbon, aluminum, and phosphorus. One reason for this is because high battery capacity, superior cycle characteristics, and the like are achieved by containing the second and third constituent elements.

In particular, a material (SnCoC-containing material) containing tin, cobalt, and carbon as constituent elements may be preferable. In the SnCoC-containing material, for example, the content of carbon may be from about 9.9 mass % to about 29.7 mass % both inclusive, and the ratio of contents of tin and cobalt (Co/(Sn+Co)) may be from about 20 mass % to about 70 mass % both inclusive, because high energy density is achieved thereby.

The SnCoC-containing material may preferably have a phase containing tin, cobalt, and carbon. Such a phase may be preferably low-crystalline or amorphous. The phase is a reaction phase capable of reacting with lithium. Therefore, due to existence of the reaction phase, superior characteristics are achieved. A half bandwidth (a diffraction angle $2\theta$) of a diffraction peak obtained by X-ray diffraction of the reaction phase may be preferably equal to or larger than 1 deg in a case where $CuK\alpha$ ray is used as a specific X ray, and the insertion rate is 1 deg/min. One reason for this is because lithium is more smoothly inserted and extracted thereby, and reactivity with the electrolytic solution is decreased. It is to be noted that, in some cases, the SnCoC-containing material may include a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in a range of 2θ=from about 20 deg to about 50 deg both inclusive. Such a reaction phase may include, for example, the foregoing respective constituent elements, and it may be considered that the low crystalline or amorphous structure thereof may result mainly from the existence of carbon.

In the SnCoC-containing material, part or all of carbon as a constituent element may be preferably bonded to a metal element or a metalloid element as other constituent element, because cohesion or crystallization of tin and/or the like is suppressed thereby. The bonding state of elements is allowed to be checked, for example, by XPS. In a commercially-available device, for example, Al-Kα ray, Mg-Kα ray, or the like may be used as a soft X ray. In the case where part or all of carbons are bonded to a metal element, a metalloid element, or the like, the peak of a synthetic wave of 1 s orbit of carbon (C1s) appears in a region lower than 284.5 eV. It is to be noted that energy calibration is made so that the peak of 4f orbit (Au4f) of gold atom is obtained in 84.0 eV. At this time, in general, because surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is considered the energy standard (284.8 eV).

The SnCoC-containing material is not limited to the material (SnCoC) configured of only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) containing tin, cobalt, iron, and carbon as constituent elements may be also preferable. The composition of the SnCoFeC-containing material may be any composition. To give an example, when the content of iron is set small, the content of carbon may be from about 9.9 mass % to about 29.7 mass % both inclusive, the content of iron may be from about 0.3 mass % to about 5.9 mass % both inclusive, and the ratio of contents of tin and cobalt (Co/(Sn+Co)) may be from about 30 mass % to about 70 mass % both inclusive. Alternatively, when the content of iron is set larger, the content of carbon may be from about 11.9 mass % to about 29.7 mass % both inclusive, the ratio of contents of tin, cobalt, and iron ((Co+Fe)/(Sn+Co+Fe)) may be from about 26.4 mass % to about 48.5 mass % both inclusive, and the ratio of contents of cobalt and iron (Co/(Co+Fe)) may be from about 9.9 mass % to about 79.5 mass % both inclusive. One reason for this is because, in such a composition range, high energy density is achieved. The physical characteristics (such as a half bandwidth) of the SnCoFeC-containing material are similar to those of the SnCoC-containing material described above.

Other than the above-mentioned materials, the anode material may be, for example, one or more of metal oxide, a polymer compound, and the like. Examples of the metal oxide may include iron oxide, ruthenium oxide, and molybdenum oxide. Examples of the polymer compound may include polyacetylene, polyaniline, and polypyrrole.

In particular, the anode material may preferably include both of the carbon material and the metal-based material for the following reason.

The metal-based material, in particular, a material that includes one or both of silicon and tin as constituent elements has an advantage of high theoretical capacity, but on the other hand, has a concern that such a material is easily and radically expanded or contracted upon an electrode reaction. On the other hand, the carbon material has a concern of low theoretical capacity, but has an advantage that the carbon material is less likely to be expanded or contracted upon an electrode reaction. For this reason, by using both of the carbon material and the metal-based material, expansion and contraction upon an electrode reaction are suppressed while achieving high theoretical capacity (in other words, battery capacity).

The anode active material layer 22B may be formed, for example, by one or more of a coating method, a vapor-phase deposition method, a liquid-phase deposition method, a spraying method, and a firing method (sintering method). The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated with the mixture dispersed in the solvent by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium per unit mass is larger than that in the case where the open circuit voltage is 4.20 V even if the same cathode active material is used. Therefore, amounts of the cathode active material and the anode active material are adjusted accordingly. Thereby, high energy density is achievable.

[Separator]

The separator 23 separates the cathode 21 from the anode 22, and passes lithium ions while preventing current short circuit resulting from contact of both electrodes. The separator 23 may be, for example, a porous film made of synthetic resin, ceramics, or the like. The separator 23 may be a laminated film in which two or more porous films are laminated. Examples of the synthetic resin may include polytetrafluoroethylene, polypropylene, and polyethylene.

In particular, the separator 23 may include, for example, the above-described porous film (the base material layer), and a polymer compound layer provided on one surface or both surfaces of the base material layer. One reason for this is because, thereby, close attachment characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are performed repeatedly, the resistance is less likely to be increased, and battery swollenness is suppressed.

The polymer compound layer may contain, for example, a polymer material such as polyvinylidene fluoride, because such a polymer material has superior physical strength and is electrochemically stable. However, the polymer material may be a material other than polyvinylidene fluoride. The polymer compound layer may be formed as follows, for example. That is, after solution in which the polymer material is dissolved is prepared, the base material layer is coated with the solution, and the resultant is subsequently dried. Alternatively, the base material layer may be soaked in the solution and may be subsequently dried.

[Electrolytic Solution]

The spirally wound electrode body 20 is impregnated with electrolytic solution as a liquid electrolyte.

The electrolytic solution includes one or more first anions represented by Formula (1). The first anion is a negative ion that includes boron (B) and nitrogen (N) as main constituent elements. Hereinafter, the first anion represented by Formula (1) is referred to as "boron-nitrogen-containing anion".

$$B(XY)_xF_yR_z^-  \quad (1)$$

(X is one of a divalent chain hydrocarbon group, a divalent fluorinated chain hydrocarbon group, and nothing. Y is one of a cyano group (—C≡N) and an isocyano group (—N$^+$≡C$^-$). R is one of a monovalent fluorinated chain hydrocarbon group and a monovalent fluorinated cyclic hydrocarbon group. x to z are integers that satisfy x>0, y≥0, z≥0, (x+y+z)=4, and (y+z)>0.)

As can be clearly seen from a possible range (x>0) of a value of x, the boron-nitrogen-containing anion necessarily includes one or more XYs.

The kind of X is not particularly limited as long as the kind of X is the divalent chain hydrocarbon group, the second fluorinated chain hydrocarbon group, or both. When the number of X is two or larger, the two or more Xs may be of the same kind, or may be of different kinds. Alternatively, part of the two or more Xs may be of the same kind.

"Divalent chain hydrocarbon group" is a collective term for a divalent chain group that is formed of carbon (C) and hydrogen (H). The divalent chain hydrocarbon group may be linear, or may be branched to include one or more side chains. Further, the divalent chain hydrocarbon group may be a chain saturated hydrocarbon group that includes no carbon-carbon multiple bond, or may be a chain unsaturated hydrocarbon group that includes carbon-carbon multiple bond. "Carbon-carbon multiple bond" refers to one or both of carbon-carbon double bond (—C═C—) and carbon-carbon triple bond (—C≡C—).

The divalent chain saturated hydrocarbon group may be, for example, an alkylene group. The carbon number of the alkylene group is not particularly limited, but may be preferably from 1 to 4 both inclusive, because dispersibility (solubility) of the boron-nitrogen-containing anion in the electrolytic solution, etc. are secured thereby. Specific examples of the alkylene group may include a methylene group (—CH$_2$—), an ethylene group (—C$_2$H$_4$—), a propylene group (—C$_3$H$_6$—), and a butylene group (—C$_4$H$_8$—).

The divalent chain unsaturated hydrocarbon group may be, for example, one of an alkenylene group and an alkynylene group. The carbon number of each of the alkenylene group and the alkynylene group is not particularly limited, but may be preferably from 1 to 4 both inclusive, because dispersibility of the boron-nitrogen-containing anion in the electrolytic solution, etc. are secured thereby. Specific examples of the alkenylene group may include a methine group (—CH═CH—) and an ethyne group (—CH═CH—CH$_2$—). Specific examples of the alkynylene group may include an ethynyl group (—C≡C—).

"Divalent fluorinated chain hydrocarbon group" is a group obtained by substituting one or more fluorine groups (—F) for one or more hydrogen groups (—H) in the above-described divalent chain hydrocarbon group. The divalent fluorinated chain hydrocarbon group may be, for example, one of a fluorinated alkylene group, a fluorinated alkenylene group, a fluorinated alkynylene group, and the like.

The fluorinated alkylene group is a group obtained by substituting one or more fluorine groups for one or more hydrogen groups in an alkylene group. In particular, the fluorinated alkylene group may be preferably a perfluoroalkylene group. The fluorinated alkenylene group is a group obtained by substituting one or more fluorine groups for one or more hydrogen groups in an alkenylene group. In particular, the fluorinated alkenylene group may be preferably a perfluoroalkenylene group. The fluorinated alkynylene group is a group obtained by substituting one or more fluorine groups for one or more hydrogen groups in an alkynylene group. In particular, the fluorinated alkynylene group may be preferably a perfluoroalkynylene group. One reason for these is because dispersibility of the boron-nitrogen-containing anion in the electrolytic solution is further improved thereby.

Specific examples of the fluorinated alkylene group may include a perfluoromethylene group (—CF$_2$—), a perfluoroethylene group (—C$_2$F$_4$—), a perfluoropropylene group (—C$_3$F$_6$—), and a perfluorobutylene group (—C$_4$F$_8$—). Specific examples of the perfluoroalkenylene group may include a perfluoromethine group (—CF═CF—) and a perfluoroethyne group (—CF═CF—CF$_2$—).

As described above, X may not be provided. In other words, X may be included in the boron-nitrogen-containing anion, or may not be included in the boron-nitrogen-containing anion. A chemical formula of the boron-nitrogen-containing anion that does not include X is represented by $(BY)_xF_yR_z^-$. When the number of X is two or larger, part of the two or more Xs may not be provided.

When the number of Y is two or larger, the two or more Ys may be of the same kind, or may be of different kinds.

As can be clearly seen from a possible range (y≥0) of a value of y, the boron-nitrogen-containing anion may include fluorine (F), or may not include fluorine.

"Monovalent fluorinated chain hydrocarbon group" is a group obtained by substituting one or more fluorine groups for one or more hydrogen groups in a monovalent chain hydrocarbon group. "Monovalent chain hydrocarbon group" is a collective term for a monovalent chain group that is formed of carbon and hydrogen. The monovalent chain hydrocarbon group may be linear, or may be branched to include one or more side chains. Further, the monovalent chain hydrocarbon group may be a chain saturated hydrocarbon group that includes no carbon-carbon multiple bond, or may be a chain unsaturated hydrocarbon group that includes carbon-carbon multiple bond.

Examples of the monovalent fluorinated chain saturated hydrocarbon group may include a fluorinated alkyl group. The carbon number of the fluorinated alkyl group is not particularly limited, but may be preferably from 1 to 4 both inclusive, because dispersibility of the boron-nitrogen-containing anion in the electrolytic solution, etc. are secured thereby.

The fluorinated alkyl group is a group obtained by substituting one or more fluorine groups for one or more hydrogen groups in an alkyl group. In particular, the fluorinated alkyl group may be preferably a perfluoroalkyl group, because dispersibility of the boron-nitrogen-containing anion in the electrolytic solution, etc. are secured thereby. Specific examples of the perfluoroalkyl group may include a perfluoromethyl group ($-CF_3$), a perfluoroethyl group ($-C_2F_5$), a perfluoropropyl group ($-C_3F_7$), and a perfluorobutyl group ($-C_4F_9$).

The monovalent fluorinated chain unsaturated hydrocarbon group may be, for example, one of a fluorinated alkenyl group, a fluorinated alkynyl group, and the like. The carbon number of each of the fluorinated alkenyl group and the fluorinated alkynyl group is not particularly limited, but may be preferably from 2 to 4 both inclusive, because dispersibility of the boron-nitrogen-containing anion in the electrolytic solution, etc. are secured thereby.

The fluorinated alkenyl group is a group obtained by substituting one or more fluorine groups for one or more hydrogen groups in an alkenyl group. In particular, the fluorinated alkenyl group may be preferably a perfluoroalkenyl group. The fluorinated alkynyl group is a group obtained by substituting one or more fluorine groups for one or more hydrogen groups in an alkynyl group. In particular, the fluorinated alkynyl group may be preferably a perfluoroalkynyl group. One reason for these is because dispersibility of the boron-nitrogen-containing anion in the electrolytic solution, etc. are secured thereby.

Specific examples of the perfluoroalkenyl group may include a perfluorovinyl group ($-CF=CF_2$) and a perfluoroallyl group ($-CF_2-CF=CF_2$). Specific examples of the perfluoroalkynyl group may include a perfluoroethynyl group ($-C\equiv CF$).

"Monovalent fluorinated cyclic hydrocarbon group" is a group obtained by substituting one or more fluorinated groups for one or more hydrogen groups in a monovalent cyclic hydrocarbon group. "Monovalent cyclic hydrocarbon group" is a collective term of a monovalent cyclic group that is formed of carbon and hydrogen. The monovalent cyclic hydrocarbon group may include one or more side chains. Further, the monovalent cyclic hydrocarbon group may be a cyclic saturated hydrocarbon group that includes no carbon-carbon multiple bond, or may be a cyclic unsaturated hydrocarbon group that includes carbon-carbon multiple bond.

The monovalent fluorinated cyclic saturated hydrocarbon group may be, for example, one or more of a fluorinated cycloalkyl group and the like. The carbon number of the fluorinated cycloalkyl group is not particularly limited, but may be preferably from 6 to 18 both inclusive, because dispersibility of the boron-nitrogen-containing anion in the electrolytic solution, etc. are secured thereby.

The fluorinated cycloalkyl group is a group obtained by substituting one or more fluorine groups for one or more hydrogen groups in a cycloalkyl group. In particular, the fluorinated cycloalkyl group may be preferably a perfluorocycloalkyl group, because dispersibility of the boron-nitrogen-containing anion in the electrolytic solution, etc. are secured thereby. Specific examples of the perfluorocycloalkyl group may include a perfluorocyclopropyl group, a perfluorocyclobutyl group, a perfluorocyclopentyl group, a perfluorocyclohexyl group, a perfluorocycloheptyl group, and a perfluorocyclooctyl group.

The monovalent fluorinated cyclic unsaturated hydrocarbon group may be, for example, one or more of a fluorinated aryl group and the like. The carbon number of the fluorinated aryl group is not particularly limited, but may be preferably from 6 to 18 both inclusive, because dispersibility of the boron-nitrogen-containing anion in the electrolytic solution, etc. are secured thereby.

The fluorinated aryl group is a group obtained by substituting one or more fluorine groups for one or more hydrogen groups in an aryl group. In particular, the fluorinated aryl group may be preferably a perfluoroaryl group, because dispersibility of the boron-nitrogen-containing anion in the electrolytic solution, etc. are secured thereby. Specific examples of the perfluoroaryl group may include a perfluorophenyl group and a perfluoronaphthyl group.

As can be clearly seen from a possible range (z≥0) of a value of z, the boron-nitrogen-containing anion may include R, or may not include R. When the number of R is two or larger, the two or more Rs may be of the same kind, or may be of different kinds. Further, part of the two or more Rs may be of the same kind.

However, because y and z satisfy (y+z)>0, the boron-nitrogen-containing anion necessarily includes one or both of fluorine and R. In other words, the boron-nitrogen-containing anion may include only fluorine, may include only R, or may include both.

One reason why the electrolytic solution includes the boron-nitrogen-containing anion is because a decomposition reaction of the electrolytic solution is suppressed thereby even when the cathode active material layer 21B of the cathode 21 includes the lithium-oxygen-containing compound. In detail, when the cathode active material layer 21B includes a material other than the lithium-oxygen-containing compound as the cathode active material, the electrolytic solution is naturally less likely to be decomposed at the time of charge and discharge. "Material other than the lithium-oxygen-containing compound" refers to a material that does not include lithium or oxygen as a constituent element, and may be sulfur or the like described above, for example. On the other hand, when the cathode active material layer 21B includes the lithium-oxygen-containing compound as the cathode active material, the electrolytic solution is naturally likely to be decomposed at the time of charge and discharge. However, when the electrolytic solution includes the boron-nitrogen-containing anion, the electrolytic solution specifically becomes less likely to be decomposed even when the cathode active material layer 21B includes the lithium-oxygen-containing compound. Accordingly, discharge capacity becomes less likely to be decreased even when charge and discharge are performed repeatedly, when the secondary battery is conserved, or when the secondary battery is charged and discharged under a high load condition. In this case, decrease in the discharge capacity is suppressed, in particular, also in a high temperature or low temperature environment, etc.

In particular, the above-described boron-nitrogen-containing anion may preferably include one or more of anions represented by respective Formulas (2) to (4), because a higher effect is achieved thereby.

$$B(X1Y1)_{x1}R1_{z1}^- \quad (2)$$

(X1 is one of a divalent chain hydrocarbon group, a divalent fluorinated chain hydrocarbon group, and nothing. Y1 is one of a cyano group and an isocyano group. R1 is one of a monovalent fluorinated chain hydrocarbon group and a monovalent fluorinated cyclic hydrocarbon group. x1 and z1 are integers that satisfy x1>0, z1>0, and (x1+z1)=4.)

$$B(X2Y2)_{x2}F_{y2}^- \quad (3)$$

(X2 is one of a divalent chain hydrocarbon group, a divalent fluorinated chain hydrocarbon group, and nothing. Y2 is one of a cyano group and an isocyano group. x2 and y2 are integers that satisfy x2>0, y2>0, and (x2+y2)=4.)

$$B(X3Y3)_{x3}F_{y3}R3_{z3}^- \quad (4)$$

(X3 is one of a divalent chain hydrocarbon group, a divalent fluorinated chain hydrocarbon group, and nothing. Y3 is one of a cyano group and an isocyano group. R3 is one of a monovalent fluorinated chain hydrocarbon group and a monovalent fluorinated cyclic hydrocarbon group. x3 to z3 are integers that satisfy x3>0, y3>0, z3>0, and (x3+y3+z3)=4.)

The anion represented by Formula (2) necessarily includes XY (X1Y1) and R (R1) out of the constituent elements shown in Formula (1). The details of X1, Y1, x1, and z1 are similar to the details of X, Y, x, and z described above.

The anion represented by Formula (3) necessarily includes XY (X2Y2) and fluorine out of the constituent elements shown in Formula (1). The details of X2, Y2, x2, and y2 are similar to the details of X, Y, x, and y described above.

The anion represented by Formula (4) necessarily includes XY (X3Y3), fluorine, and R (R3) out of the constituent elements shown in Formula (1). The details of X3, Y3, x3, y3, and z3 are similar to the details of X, Y, x, y, and z described above.

Out of the anions represented by Formula (2), specific examples of the anion that includes a cyano group as Y1 may include $B(CN)_3(CF_3)^-$, $B(CN)_2(CF_3)_2^-$, $B(CN)(CF_3)_3^-$, $B(CN)_3(C_2F_5)^-$, $B(CN)_2(C_2F_5)_2^-$, $B(CN)(C_2F_5)_3^-$, $B(CN)_3(C_6F_5)^-$, $B(CN)_2(C_6F_5)_2^-$, and $B(CN)(C_6F_5)_3^-$.

Out of the anions represented by Formula (2), specific examples of the anion that includes an isocyano group as Y1 may include $B(NC)_3(CF_3)^-$, $B(NC)_2(CF_3)_2^-$, $B(NC)(CF_3)_3^-$, $B(NC)_3(C_2F_5)^-$, $B(NC)_2(C_2F_5)_2^-$, $B(NC)(C_2F_5)_3^-$, $B(NC)_3(C_6F_5)^-$, $B(NC)_2(C_6F_5)_2^-$, and $B(NC)(C_6F_5)_3^-$.

Out of the anions represented by Formula (3), specific examples of the anion that includes a cyano group as Y2 may include $B(CN)_3F^-$, $B(CN)_2F_2^-$, and $B(CN)F_3^-$.

Out of the anions represented by Formula (3), specific examples of the anion that includes an isocyano group as Y2 may include $B(NC)_3F^-$, $B(NC)_2F_2^-$, and $B(NC)_3F^-$.

Out of the anions represented by Formula (4), specific examples of the anion that includes a cyano group as Y3 may include $B(CN)_2F(CF_3)^-$, $B(CN)F_2(CF_3)^-$, $B(CN)F(CF_3)_2^-$, $B(CN)_2F(C_2F_5)^-$, $B(CN)F_2(C_2F_5)^-$, and $B(CN)F(C_2F_5)_2^-$.

Out of the anions represented by Formula (4), specific examples of the anion that includes an isocyano group as Y3 may include $B(NC)_2F(CF_3)^-$, $B(NC)F_2(CF_3)^-$, $B(NC)F(CF_3)_2^-$, $B(NC)_2F(C_2F_5)^-$, $B(NC)F_2(C_2F_5)^-$, and $B(NC)F(C_2F_5)_2^-$.

The electrolytic solution may preferably include one or more of cations (positive ions), together with the above-described boron-nitrogen-containing anion, because dispersibility of the boron-nitrogen-containing anion in the electrolytic solution, etc. are secured thereby.

The kind of the cation is not particularly limited, but may be alkali metal ion, alkaline-earth metal ion, or the like, for example. The alkali metal ion is an element that belongs to Group 1 in the long form of the periodic table. Examples of the alkali metal ion may include lithium ion ($Li^+$), sodium ion ($Na^+$), and potassium ion ($K^+$). The alkaline-earth metal ion is an element that belongs to Group 2 in the long form of the periodic table. Examples of the alkaline-earth metal ion may include magnesium ion ($Mg^{2+}$) and calcium ion ($Ca^{2+}$). In particular, the cation may be preferably lithium ion, because stability of the boron-nitrogen-containing anion in the electrolytic solution, etc. are improved thereby.

The boron-nitrogen-containing anion described above may have any role (any function) in the electrolytic solution. To give an example, the boron-nitrogen-containing anion may perform a role serving as an electrolyte salt described later by forming a salt with the cation. The kind of the salt formed by the boron-nitrogen-containing anion and the cation is not particularly limited as long as the kind thereof is one or more of salts configured of a combination of the boron-nitrogen-containing anion and the cation. To give an example, a salt configured of a combination of $B(CN)_3(CF_3)^-$ which is the boron-nitrogen-containing anion and lithium ion ($Li^+$) which is the cation is $LiB(CN)_3(CF_3)$.

In particular, the electrolytic solution may include a second anion (excluding anions belonging to the boron-nitrogen-containing anion) together with the above-described boron-nitrogen-containing anion. In particular, the second anion may preferably include fluorine as a constituent element, because a combination of the boron-nitrogen-containing anion and the second anion achieves a higher effect.

Specifically, the second anion may include one or more of hexafluorophosphate ion ($PF_6^-$), tetrafluoroborate ion ($BF_4^-$), hexafluoroarsenate ion ($AsF_6^-$), trifluoromethanesulfonate ion ($CF_3SO_3^-$), hexafluorosilicate ion ($Li_2SiF_6^-$), bis(fluorosulfonyl)imide ion ($N(FSO_2)_2^-$), and ions represented by respective Formulas (5) to (10), because such anions are easily available or easily manufactured.

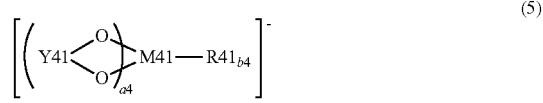

(5)

(M41 is one of transition metal elements, Group 13 elements, Group 14 elements, and Group 15 elements in long form of periodic table. R41 is a halogen group. Y41 is one of —C(=O)—R42-C(=O)—, —C(=O)—CR43$_2$-, and —C(=O)—C(=O)—. R42 is one of an alkylene group, a halogenated alkylene group, an arylene group, and a halogenated arylene group. R43 is one of an alkyl group, a halogenated alkyl group, an aryl group, and a halogenated aryl group. a4 is an integer from 1 to 4 both inclusive. b4 is an integer of one of 0, 2, and 4.)

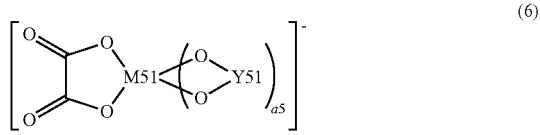

(6)

(X51 is one of Group 1 elements and Group 2 elements in the long form of the periodic table. M51 is one of transition metal elements, Group 13 elements, Group 14 elements, and Group 15 elements in the long form of the periodic table. Y51 is one of —C(=O)—$(CR51_2)_{b5}$—C(=O)—, —$R53_2C$—$(CR52_2)_{c5}$—C(=O)—,            —$R53_2C$—$(CR52_2)_{c5}$—$CR53_2$-,    —$R53_2C$—$(CR52_2)_{c5}$-S(=O)$_2$—, —S(=O)$_2$—$(CR52_2)_{d5}$—S(=O)$_2$—,  and   —C(=O)— $(CR52_2)_{d5}$—S(=O)$_2$. R51 and R53 are each one of a hydrogen group, an alkyl group, a halogen group, and a halogenated alkyl group. R51, R53, or both are each one of a halogen group and a halogenated alkyl group. R52 is one of a hydrogen group, an alkyl group, a halogen group, and a halogenated alkyl group. a5 is an integer of one of 1 and 2.)

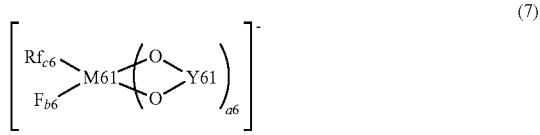

(7)

(X61 is one of Group 1 elements and Group 2 elements in the long form of the periodic table. M61 is one of transition metal elements, Group 13 elements, Group 14 elements, and Group 15 elements in the long form of the periodic table. Rf is one of a fluorinated alkyl group and a fluorinated aryl group, and has carbon number from 1 to 10 both inclusive. Y61 is one of —C(=O)—$(CR61_2)_{d6}$—C(=O)—, —$R62_2C$—$(CR61_2)_{d6}$—C(=O)—,      —$R62_2C$— $(CR61_2)_{d6}$—$CR62_2$-,    —$R62_2C$—$(CR61_2)_{d6}$—S(=O)$_2$—, —S(=O)$_2$—$(CR61_2)_{e6}$—S(=O)$_2$—,  and   —C(=O)— $(CR61_2)_{e6}$—S(=O)$_2$. R61 is one of a hydrogen group, an alkyl group, a halogen group, and a halogenated alkyl group. R62 is one of a hydrogen group, an alkyl group, a halogen group, and a halogenated alkyl group. At least one of R62s is one of the halogen group and the halogenated alkyl group. a6 is an integer of one of 1 and 2. b6 and c6 are each an integer from 1 to 4 both inclusive.)

$$N(C_mF_{2m+1}SO_2)(C_nF_{2n+1}SO_2)^-$$ (8)

(m and n are each an integer of 1 or larger.)

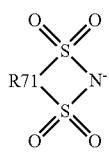

(9)

(R71 is a linear or branched perfluoroalkylene group having carbon number from 2 to 4 both inclusive.)

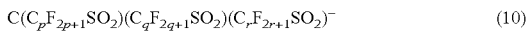

(p, q, and r are each an integer of 1 or larger.)

In the compound represented by Formula (5), R41 and R43 may be groups of the same kind, or may be groups of different kinds. This is similarly applicable to R51 to R53 in the compound represented by Formula (6), and to R61 and R62 in the compound represented by Formula (7).

It is to be noted that Group 1 elements are hydrogen (H), lithium (Li), sodium (Na), potassium (K), rubidium (Rb), cesium (Cs), and francium (Fr). Group 2 elements are beryllium (Be), magnesium (Mg), calcium (Ca), strontium (Sr), barium (Ba), and radium (Ra). Group 13 elements are boron (B), aluminum (Al), gallium (Ga), indium (In), and thallium (Tl). Group 14 elements are carbon (C), silicon (Si), germanium (Ge), tin (Sn), and lead (Pb). Group 15 elements are nitrogen (N), phosphorous (P), arsenic (As), antimony (Sb), and bismuth (Bi).

Examples of the compound represented by Formula (5) may include compounds represented by respective Formulas (5-1) to (5-5). Examples of the compound represented by Formula (6) may include compounds represented by respective Formulas (6-1) to (6-8). Examples of the compound represented by Formula (7) may include a compound represented by Formula (7-1).

(5-1)

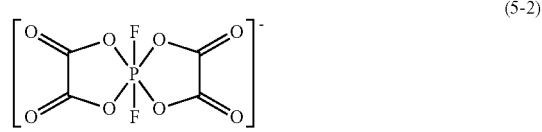

(5-2)

(5-3)

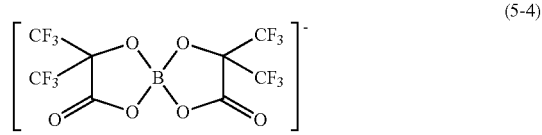

(5-4)

(5-5)

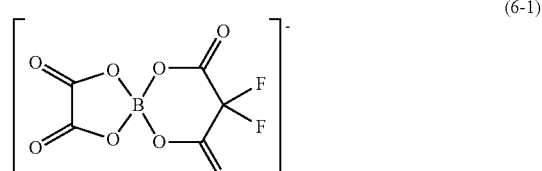

(6-1)

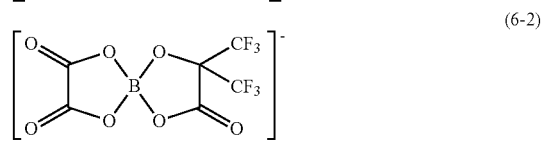

(6-2)

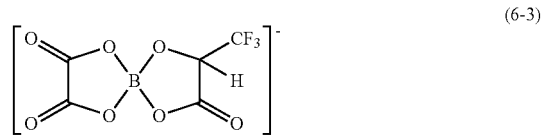

(6-3)

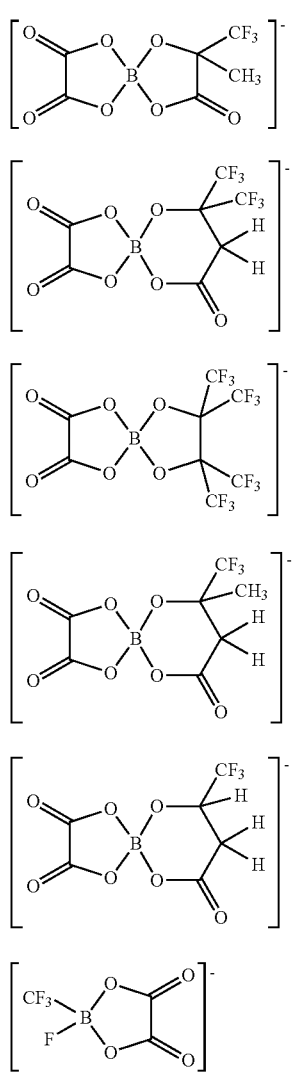

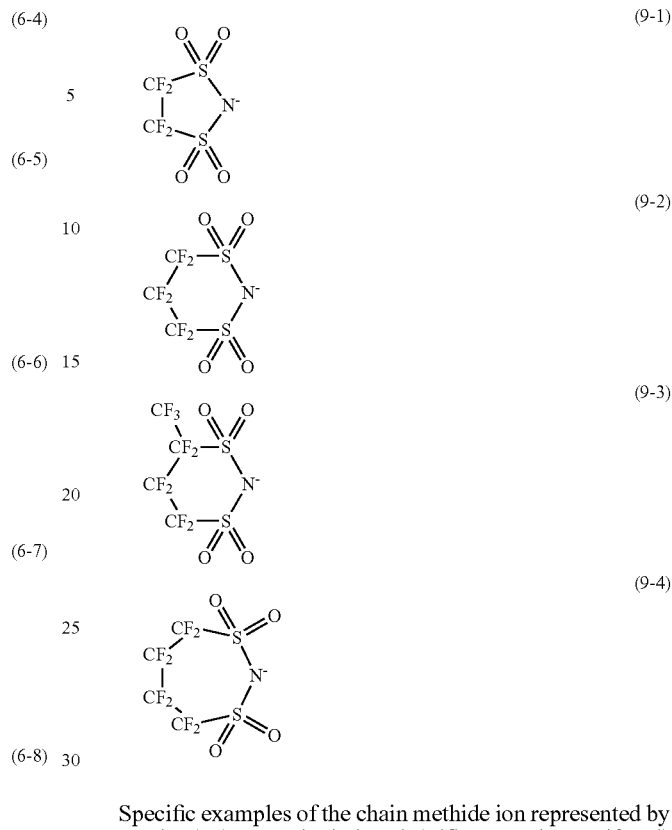

The compound represented by Formula (8) is a chain imide ion. The compound represented by Formula (9) is a cyclic imide ion. The compound represented by Formula (10) is a chain methide ion. In the chain imide ion represented by Formula (8), values of m and n may be the same value, or may be different values. This is similarly applicable to p, q, and r in the chain methide ion represented by Formula (10).

Specific examples of the chain imide ion represented by Formula (8) may include bis(trifluoromethanesulfonyl) imide ion ($N(CF_3SO_2)_2^-$), bis(pentafluoroethanesulfonyl) imide ion ($N(C_2F_5SO_2)_2^-$), (trifluoromethanesulfonyl) (pentafluoroethanesulfonyl) imide ion ($N(CF_3SO_2)(C_2F_5SO_2)^-$), (trifluoromethanesulfonyl) (heptafluoropropanesulfonyl) imide ion ($N(CF_3SO_2)(C_3F_7SO_2)^-$), and (trifluoromethanesulfonyl) (nonafluorobutanesulfonyl) imide ion ($N(CF_3SO_2)(C_4F_9SO_2)^-$).

Specific examples of the cyclic imide ion represented by Formula (9) may include anions represented by respective Formulas (9-1) to (9-4).

Specific examples of the chain methide ion represented by Formula (10) may include tris(trifluoromethanesulfonyl) methide ion ($C(CF_3SO_2)_3^-$).

As with the boron-nitrogen-containing anion, the second anion described above may have any role in the electrolytic solution. To give an example, the second anion may perform a role serving as an electrolyte salt by forming a salt with the cation. The kind of the salt formed by the second anion and the cation is not particularly limited as long as the kind thereof is one or more of salts configured of a combination of the second anion and the cation. To give an example, a salt configured of a combination of hexafluorophosphate ion ($PF_6^-$) which is the second anion and lithium ion ($Li^+$) which is the cation is $LiPF_6$.

When the boron-nitrogen-containing ion is included as part (a constituent ion) of a first electrolyte salt in the electrolytic solution, and the second anion is included therein as part of a second electrolyte salt, a ratio of the first electrolyte salt with respect to the sum of the first electrolyte salt and the second electrolyte salt is not particularly limited.

In particular, where a content (mol/kg) of the first electrolyte salt in the electrolytic solution is A, and a content (mol/kg) of the second electrolyte salt in the electrolytic solution is B, a ratio (%) of A represented by $[A/(A+B)] \times 100$ may be preferably from about 1% to about 50% both inclusive, and may be more preferably from about 5% to about 50% both inclusive, because the decomposition reaction of the electrolytic solution is suppressed thereby while high battery capacity is retained.

It is to be noted that the electrolytic solution may include one or more other materials, together with the boron-nitrogen-containing anion and the cation described above.

The other materials may be, for example, one or more of solvents such as a non-aqueous solvent. Electrolytic solution that includes the non-aqueous solvent as a solvent is so-called non-aqueous electrolytic solution.

Examples of the non-aqueous solvent may include cyclic ester carbonate, chain ester carbonate, lactone, chain carboxylic ester, and nitrile, because superior solubility, compatibility, etc. are obtained thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Moreover, examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidone, N-methyloxazolidinone, N,N'-dimethylimidazolidinone, nitromethane, nitroethane, sulfolane, trimethyl phosphate, and dimethylsulfoxide, because a similar advantage is achieved thereby.

In particular, one or more of ethylene carbonate, propylene carbonate, dimethyl carbonate, diethyl carbonate, and ethyl methyl carbonate may be preferable. In this case, a combination of a high viscosity (high dielectric constant) solvent (for example, specific dielectric constant ∈≥30) such as ethylene carbonate or propylene carbonate and a low viscosity solvent (for example, viscosity≤1 mPa·s) such as dimethyl carbonate, ethyl methyl carbonate, or diethyl carbonate may be more preferable. One reason for this is because the dissociation characteristics of the electrolyte salt and ion mobility are improved thereby in the electrolytic solution.

Other than this, the non-aqueous solvent may be one or more of unsaturated cyclic ester carbonates, because a stable protective film is thereby formed on the surface of the electrode at the time of charge and discharge, and the decomposition reaction of the electrolytic solution is therefore suppressed.

The unsaturated cyclic ester carbonate is a cyclic ester carbonate that includes one or more unsaturated bonds (carbon-carbon double bonds). More specifically, the unsaturated cyclic ester carbonate may be one or more of vinylene-carbonate-based compounds represented by Formula (16), vinyl-ethylene-carbonate-based compounds represented by Formula (17), and methylene-ethylene-carbonate-based compounds represented by Formula (18). R21 and R22 may be groups of the same kind, or may be groups of different kinds. This is similarly applicable to R23 to R26. A content of the unsaturated cyclic ester carbonate in the solvent is not particularly limited, but may be from about 0.01 wt % to about 10 wt % both inclusive, for example.

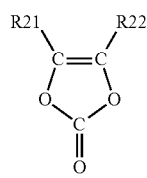

(16)

(R21 and R22 are each one of a hydrogen group and an alkyl group.)

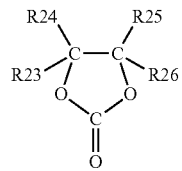

(17)

(R23 to R26 are each one of a hydrogen group, an alkyl group, a vinyl group, and an allyl group, and at least one of R23 to R26 is one of the vinyl group and the allyl group.)

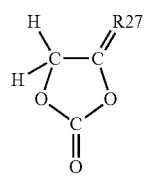

(18)

(R27 is an alkylene group.)

Examples of the vinylene-carbonate-based compound may include vinylene carbonate (1,3-dioxole-2-one), methyl vinylene carbonate (4-methyl-1,3-dioxole-2-one), ethyl vinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. In particular, vinylene carbonate may be preferable, because vinylene carbonate is easily available, and achieves a high effect.

Examples of the vinyl-ethylene-carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate may be preferable, because vinyl ethylene carbonate is easily available, and achieves a high effect. It goes without saying that, as R32 to R35, all of them may be vinyl groups, all of them may be allyl groups, and vinyl groups and allyl groups may be coexist.

Examples of the methylene-ethylene-carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one. The methylene-ethylene-carbonate-based compound may be a compound that has two methylene groups, other than a compound that has one methylene group as represented by Formula (18). It is to be noted that R29 may be a divalent group represented by >CR₂ (R is an alkyl group).

Other than above, the unsaturated cyclic ester carbonate may be, for example, catechol carbonate that has a benzene ring, or the like.

Moreover, the non-aqueous solvent may be one or more of halogenated ester carbonates, because a stable protective film is thereby formed on the surface of the electrode at the time of charge and discharge, and the decomposition reaction of the electrolytic solution is therefore suppressed. The halogenated ester carbonate is cyclic or chain ester carbonate that includes one or more halogens as constituent elements. More specifically, the cyclic halogenated ester carbonate may be a compound represented by Formula (19), and the chain halogenated ester carbonate may be a compound represented by Formula (20). R28 to R31 may be groups of the same kind, or may be groups of different kinds. Part of R28 to R31 may be groups of the same kind. This is similarly applicable to R32 to R37. A content of the halogenated ester carbonate in the solvent is not particularly limited, but may be from about 0.01 wt % to about 50 wt % both inclusive, for example.

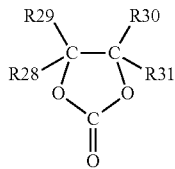

(19)

(R28 to R31 are each one of a hydrogen group, a halogen group, an alkyl group, and a halogenated alkyl group, and at least one of R28 to R31 is one of the halogen group and the halogenated alkyl group.)

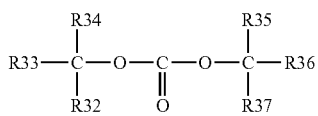

(20)

(R32 to R37 are each one of a hydrogen group, a halogen group, an alkyl group, and a halogenated alkyl group, and at least one of R32 to R37 is one of the halogen group and the halogenated alkyl group.)

The kind of the halogen is not particularly limited. However, in particular, one or more of fluorine, chlorine, bromine, and iodine may be preferable, and fluorine may be more preferable, because a higher effect is achieved thereby compared to other halogens. It is to be noted that the number of halogens may be preferably two than one, and may be three or more. One reason for this is because ability of forming a protective film is increased thereby and more rigid and stable protective film is formed, which further suppresses the decomposition reaction of the electrolytic solution.

Examples of the cyclic halogenated ester carbonate may include compounds represented by respective Formulas (19-1) to (19-21) below, which includes geometric isomers. In particular, 4-fluoro-1,3-dioxolane-2-one represented by Formula (19-1) or 4,5-difluoro-1,3-dioxolane-2-one represented by Formula (19-3) may be preferable, and the latter may be more preferable. Moreover, as 4,5-difluoro-1,3-dioxolane-2-one, a trans-isomer may be more preferable than a cis-isomer, because the trans-isomer thereof is easily available, and achieves a high effect. On the other hand, examples of the chain halogenated ester carbonate may include fluoromethylmethyl carbonate, bis(fluoromethyl) carbonate, and difluoromethyl methyl carbonate.

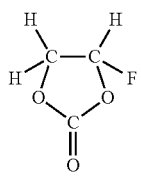

(19-1)

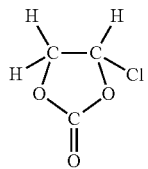

(19-2)

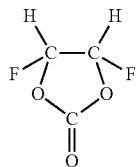

(19-3)

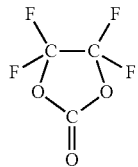

(19-4)

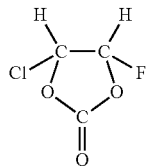

(19-5)

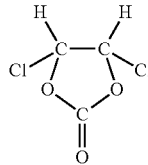

(19-6)

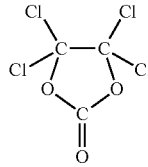

(19-7)

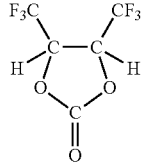

(19-8)

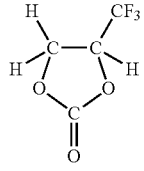

(19-9)

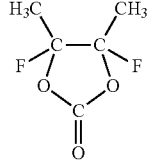

(19-10)

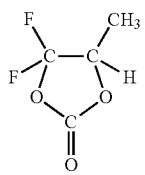
(19-11)

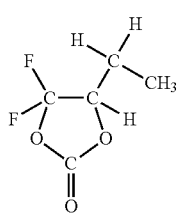
(19-12)

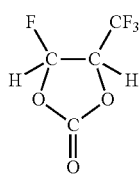
(19-13)

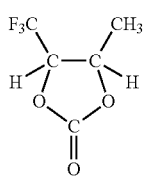
(19-14)

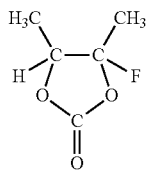
(19-15)

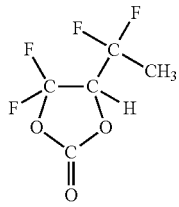
(19-16)

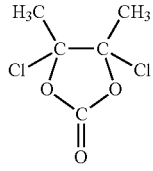
(19-17)

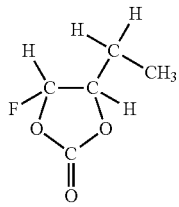
(19-18)

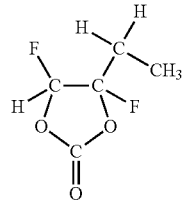
(19-19)

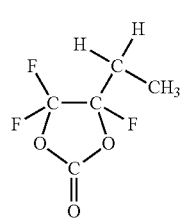
(19-20)

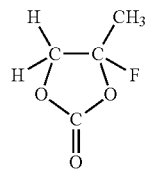
(19-21)

Moreover, the non-aqueous solvent may be ester sulfonate, because chemical stability of the electrolytic solution is further improved thereby. Examples of the ester sulfonate may include monosulfonate ester and disulfonate ester.

The monosulfonate ester may be cyclic monosulfonate ester, or may be chain monosulfonate ester. Examples of the cyclic monosulfonate ester may include sultone such as propane sultone and propene sultone. The chain monosulfonate ester is obtained by cutting the cyclic monosulfonate ester in the middle. To give an example, the chain monosulfonate ester in a case where propane sultone is cut in the middle may be $CH_3-CH_2-CH_2-SO_3-CH_3$, or the like. A direction of $-SO_3-(-S(=O)_2-O-)$ is not particularly limited. Specifically, $CH_3-CH_2-CH_2-SO_3-CH_3$ described above may be $CH_3-CH_2-CH_2-S(=O)_2-O-CH_3$, or may be $CH_3-CH_2-CH_2-O-S(=O)_2-CH_3$.

The disulfonate ester may be cyclic disulfonate ester, or may be chain disulfonate ester. Examples of the cyclic disulfonate ester may include compounds represented by respective Formulas (21-1) to (21-3). The chain disulfonate ester is obtained by cutting the cyclic disulfonate ester in the middle. To give an example, the chain disulfonate ester in a case where the compound represented by Formula (21-1) is cut in the middle may be $CH_3-SO_3-CH_2-CH_2-SO_3-CH_3$, or the like. Directions of two $-SO_3-(-S(=O)_2-O-)$ are not particularly limited. Specifically, $CH_3-SO_3-CH_2-CH_2-SO_3-CH_3$ described above may be $CH_3-S(=O)_2-O-CH_2-CH_2-S(=O)_2-O-CH_3$, $CH_3-O-S(=O)_2-CH_2-CH_2-S(=O)_2-(O)-CH_3$, or $CH_3-S(=O)_2-O-CH_2-CH_2-O-S(=O)_2-CH_3$.

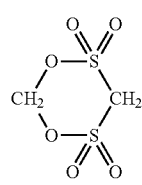
(21-1)

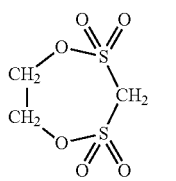

(21-2)

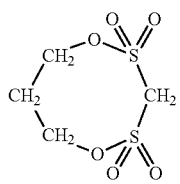

(21-3)

A content of the ester sulfonate in the solvent is not particularly limited, but may be from about 0.5 wt % to about 5 wt % both inclusive.

Moreover, the non-aqueous solvent may be acid anhydride, because chemical stability of the electrolytic solution is further improved thereby. Examples of the acid anhydride may include carboxylic anhydride, disulfonic anhydride, and carboxylic sulfonic anhydride. Examples of the carboxylic anhydride may include succinic anhydride, glutaric anhydride, and maleic anhydride. Examples of the disulfonic anhydride may include ethane disulfonic anhydride and propane disulfonic anhydride. Examples of the carboxylic sulfonic anhydride may include sulfobenzoic anhydride, sulfopropionic anhydride, and sulfobutyric anhydride. A content of the acid anhydride in the solvent is not particularly limited, but may be from about 0.5 wt % to about 5 wt % both inclusive, for example.

Moreover, the non-aqueous solvent may be a dicyano compound or a diisocyanate compound, because chemical stability of the electrolytic solution is further improved thereby. The dicyano compound may be, for example, a compound represented by NC—$C_mH_{2m}$—CN (m is an integer of 1 or larger). More specifically, the dicyano compound may be, for example, NC—$C_2H_4$—CN. The diisocyanate compound may be, for example, a compound represented by OCN—$C_nH_{2n}$—NCO (n is an integer of 1 or larger). More specifically, the diisocyanate compound may be, for example, OCN—$C_6H_{12}$—NCO or the like. A content of the dicyano compound in the solvent is not particularly limited, but may be from about 0.5 wt % to about 5 wt % both inclusive, for example. This range of the content may be similarly applicable, for example, to the diisocyanate compound.

[Electrolyte Salt]

The electrolyte salt may contain, for example, one or more of salts such as lithium salt. However, the electrolyte salt may contain, for example, salt other than the lithium salt. Examples of "salt other than the lithium salt" may include light metal salt other than lithium salt.

Examples of the lithium salt may include lithium perchlorate ($LiClO_4$), lithium tetraphenylborate ($LiB(C_6H_5)_4$), lithium methanesulfonate ($LiCH_3SO_3$), lithium tetrachloroaluminate ($LiAlCl_4$), lithium chloride (LiCl), lithium bromide (LiBr), and a compound represented by Formula (22-1), because superior battery capacity, superior cycle characteristics, superior conservation characteristics, and the like are thereby achieved.

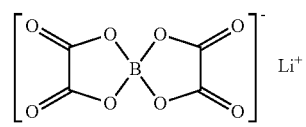

(22-1)

A content of the electrolyte salt is not particularly limited, but in particular, may be preferably from about 0.3 mol/kg to about 3.0 mol/kg both inclusive with respect to the solvent, for example, because high ion conductivity is achieved thereby.

[Operation of Secondary Battery]

The secondary battery may operate, for example, as follows. At the time of charge, lithium ions extracted from the cathode 21 may be inserted in the anode 22 through the electrolytic solution. At the time of discharge, lithium ions extracted from the anode 22 may be inserted in the cathode 21 through the electrolytic solution.

[Method of Manufacturing Secondary Battery]

The secondary battery may be manufactured, for example, by the following procedure.

When fabricating the cathode 21, first, the cathode active material is mixed with the cathode binder, the cathode electric conductor, and/or the like as necessary to obtain a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded with the use of a roll pressing machine and/or the like while heating as necessary. In this case, compression-molding may be repeated several times.

When fabricating the anode 22, the anode active material layer 22B is formed on the anode current collector 22A by a procedure similar to that of the cathode 21 described above. Specifically, the anode active material is mixed with the anode binder, the anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded with the use of a roll pressing machine and/or the like.

When preparing the electrolytic solution, the boron-nitrogen-containing anion is mixed with other materials such as cation, the solvent, and the electrolyte salt as necessary, and thereafter, the mixture is stirred.

When assembling the secondary battery using the cathode 21 and the anode 22, the cathode lead 25 is attached to the cathode current collector 21A by a welding method and/or the like, and the anode lead 26 is attached to the anode current collector 22A by a welding method and/or the like. Subsequently, the cathode 21 and the anode 22 are laminated with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Functions and Effects of Secondary Battery]

In the cylindrical-type lithium ion secondary battery, the cathode active material layer 21B of the cathode 21 includes the lithium-oxygen-containing compound, and the electrolytic solution includes the boron-nitrogen-containing anion. In this case, the decomposition reaction of the electrolytic solution is suppressed even when the cathode 21 includes the lithium-oxygen-containing compound as described above. Accordingly, superior battery characteristics are achieved.

In particular, when the divalent fluorinated chain hydrocarbon group is a perfluoroalkylene group, the monovalent fluorinated chain hydrocarbon group is a perfluoroalkyl group or the like, and the monovalent fluorinated cyclic hydrocarbon group is a perfluoroaryl group or the like in Formula (1), a higher effect is achieved.

Moreover, when the boron-nitrogen-containing anion includes one or more of the anions represented by respective Formulas (2) to (4), a higher effect is achieved.

Moreover, when the electrolytic solution includes, as the cation, alkali metal ion, alkaline-earth metal ion, or both, and in particular, when the electrolytic solution includes lithium ion, a higher effect is achieved.

Moreover, when the electrolytic solution includes the second anion such as hexafluorophosphate ion ($PF_6^-$), a higher effect is achieved.

Moreover, when the lithium-oxygen-containing compound includes one or more of the compounds represented by respective Formulas (11) to (15), a higher effect is achieved.

[1-2. Lithium Ion Secondary Battery (Laminated Film Type)]

Figure 3:
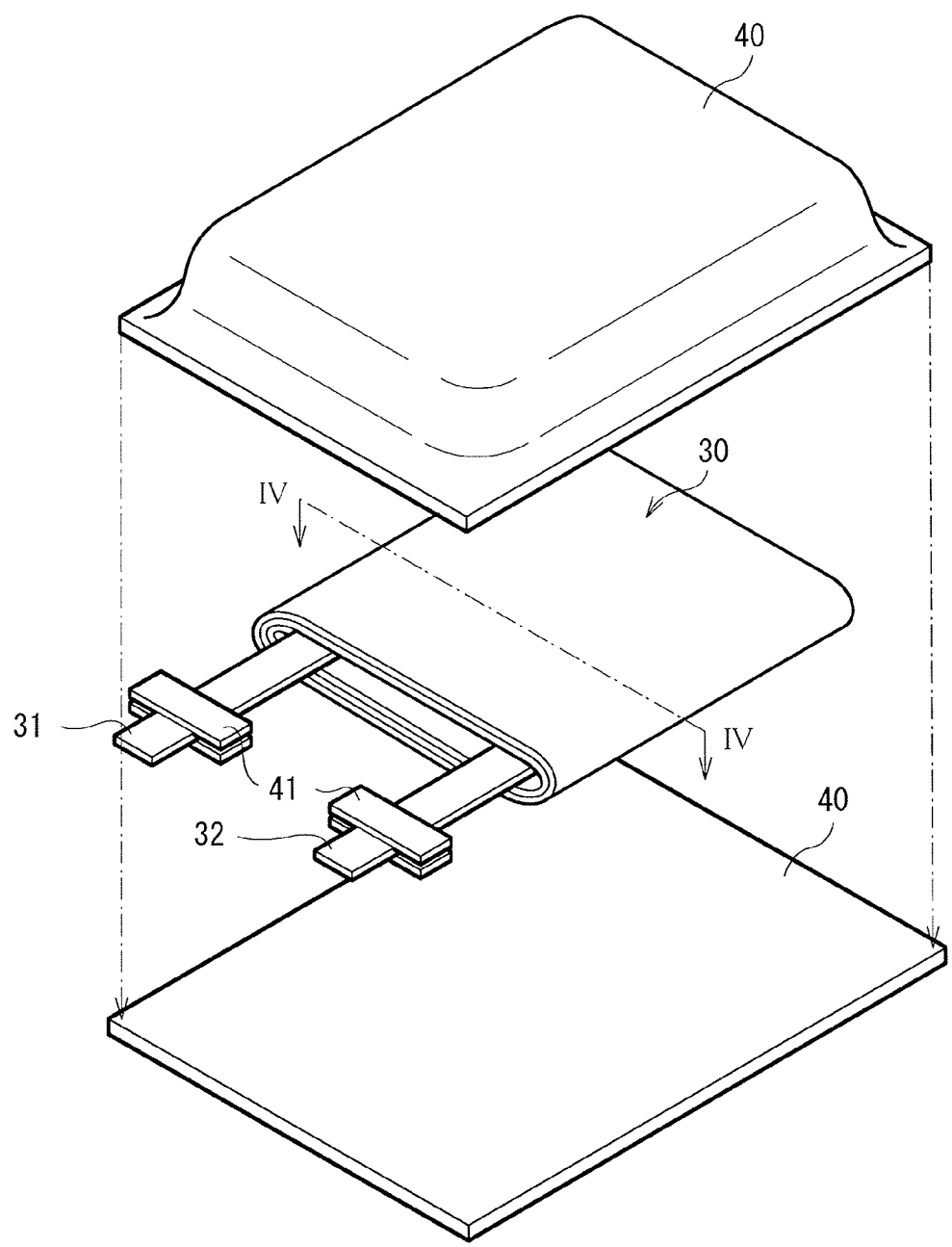
FIG. 3 is a perspective view illustrating a configuration of another secondary battery (of a laminated film type) that uses the electrolytic solution of an embodiment of the present application.
Figure 4:
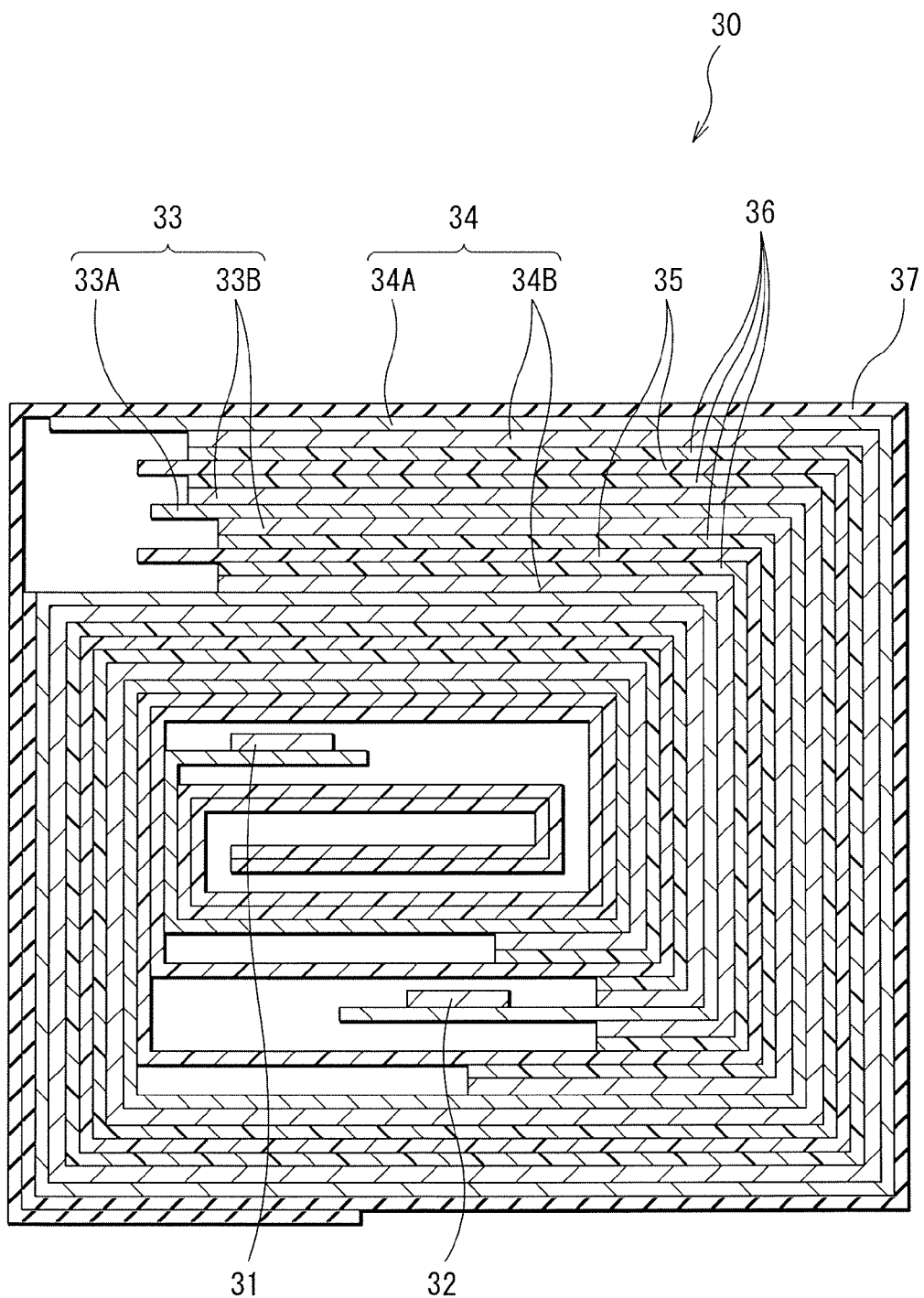
FIG. 4 is a cross-sectional view of a spirally wound electrode body taken along a line IV-IV illustrated in FIG. 3.

FIG. 3 illustrates an exploded perspective configuration of another secondary battery of an embodiment of the present application. FIG. 4 illustrates an enlarged cross-section taken along a line IV-IV of a spirally wound electrode body 30 illustrated in FIG. 3. In the following description, the components of the cylindrical-type secondary battery described above will be used where appropriate.

[General Configuration of Secondary Battery]

The secondary battery described here is a lithium ion secondary battery. The secondary battery contains the spirally wound electrode body 30 in a film-like outer package member 40. A form of the secondary battery that uses the film-like outer package member 40 is called a laminated film type. In the spirally wound electrode body 30, for example, a cathode 33 and an anode 34 may be laminated with a separator 35 and an electrolyte layer 36 in between and may be spirally wound. A cathode lead 31 is connected to the cathode 33, and an anode lead 32 is connected to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of an electrically-conductive material such as aluminum, and the anode lead 32 may be made, for example, of an electrically-conducive material such as copper, nickel, and stainless steel. These electrically-conductive materials may be in the shape, for example, of a thin plate or mesh.

The outer package member 40 may be a laminated film in which, for example, a fusion bonding layer, a metal layer, and a surface protective layer are laminated in this order. In the laminated film, outer edges of the two film-shaped fusion bonding layers are fusion bonded so that the fusion bonding layers are opposed to the spirally wound electrode body 30. However, the two films may be bonded to each other by an adhesive, or the like. Examples of the fusion bonding layer may include a film made of one or more of polyethylene, polypropylene, and the like. Examples of the metal layer may include an aluminum foil. Examples of the surface protective layer may include a film made of one or more of nylon, polyethylene terephthalate, and the like.

In particular, the outer package member 40 may be preferably an aluminum laminated film in which a polyethylene film, an aluminum foil, and a nylon film are laminated in this order. However, the outer package member 40 may be a laminated film having other laminated structure, a polymer film such as polypropylene, or a metal film.

For example, a close-attachment film 41 may be inserted between the outer package member 40 and the cathode lead 31 and between the outer package member 40 and the anode lead 32 in order to prevent outside air intrusion. The close-attachment film 41 is made of a material having close-attachment characteristics with respect to the cathode lead 31 and the anode lead 32. Examples of the material having close-attachment characteristics may include polyolefin resin that may include one or more of polyethylene, polypropylene, modified polyethylene, and modified polypropylene.

The cathode 33 may have, for example, a cathode active material layer 33B on one surface or both surfaces of a cathode current collector 33A. The anode 34 may have, for example, an anode active material layer 34B on one surface or both surfaces of an anode current collector 34A. The configurations of the cathode current collector 33A, the cathode active material layer 33B, the anode current collector 34A, and the anode active material layer 34B may be, for example, similar to the configurations of the cathode current collector 21A, the cathode active material layer 21B, the anode current collector 22A, and the anode active material layer 22B, respectively. The configuration of the separator 35 may be, for example, similar to the configuration of the separator 23.

The electrolyte layer 36 includes electrolytic solution and a polymer compound, and the electrolytic solution is held by the polymer compound. The electrolyte layer 36 is a so-called gel electrolyte, because thereby, high ion conductivity (for example, 1 mS/cm or more at room temperature) is obtained and liquid leakage of the electrolytic solution is prevented. The electrolyte layer 36 may further contain other material such as an additive as necessary.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, a copolymer of vinylidene fluoride and hexafluoropyrene, and the like. In particular, polyvinylidene fluoride or the copolymer of vinylidene fluoride and hexafluoropyrene may be preferable, and polyvinylidene fluoride may be more preferable, because such a polymer compound is electrochemically stable.

For example, the configuration of the electrolytic solution may be similar to the configuration of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. At the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three kinds of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, precursor solution containing electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are laminated with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 in the outer package members 40. In this case, the close-attachment films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are laminated with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method and/or the like, and the spirally wound body is contained in the pouch-like outer package member 40. Subsequently, electrolytic solution, monomers as a raw material for the polymer compound, a polymerization initiator, and, on as necessary basis, other materials such as a polymerization inhibitor are mixed to prepare a composition for electrolyte. Subsequently, the composition for electrolyte is injected into the pouch-like outer package member 40. Thereafter, the outer package member 40 is hermetically sealed by a thermal fusion bonding method and/or the like. Subsequently, the monomers are thermally polymerized, and thereby, a polymer compound is formed. Thereby, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples thereof may include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is closely attached to the cathode 33 and the anode 34 with the polymer compound in between. Thereby, the polymer compound is impregnated with the electrolytic solution, the polymer compound is gelated, and accordingly, the electrolyte layer 36 is formed.

In the third procedure, swollenness of the secondary battery is suppressed more than in the first procedure. Further, in the third procedure, little of the monomer as a raw material of the polymer compound, the solvent, and the like are left in the electrolyte layer 36, compared to in the second procedure. Therefore, the formation step of the polymer compound is favorably controlled. Therefore, the cathode 33, the anode 34, and the separator 35 are sufficiently and closely attached to the electrolyte layer 36.

[Functions and Effects of Secondary Battery]

According to the laminated-film-type secondary battery, the cathode active material layer 33B of the cathode 33 includes the lithium-oxygen-containing compound, and the electrolytic solution in the electrolyte layer 36 includes the boron-nitrogen-containing anion. Accordingly, superior battery characteristics are achieved for a reason similar to the reason for the cylindrical-type secondary battery. Functions and effects other than the above are similar to those of the cylindrical-type secondary battery.

[1-3. Lithium Metal Secondary Battery (Cylindrical Type and Laminated Film Type)]

A secondary battery described here is a cylindrical-type lithium secondary battery (a lithium metal secondary battery) in which capacity of the anode 22 is represented by precipitation and dissolution of lithium metal. The secondary battery has a configuration similar to the configuration of the lithium ion secondary battery (of a cylindrical type)

described above, and is manufactured by similar procedures, except that the anode active material layer 22B is formed of lithium metal.

In this secondary battery, lithium metal is used as the anode active material, which achieves high energy density. The anode active material layer 22B may be present at the time of assembling. However, the anode active material layer 22B may not be present at the time of assembling, and may be formed of lithium metal that is precipitated at the time of charge. Further, the anode active material layer 22B may be utilized as a current collector, and the anode current collector 22A may be omitted.

This secondary battery may operate as follows, for example. At the time of charge, when lithium ion is extracted from the cathode 21, the extracted lithium ion is precipitated, through the electrolytic solution, as lithium metal on the surface of the anode current collector 22A. At the time of discharge, when lithium metal is dissolved as lithium ion from the anode active material layer 22B into the electrolytic solution, the lithium ion is inserted into the cathode 21 through the electrolytic solution.

According to this cylindrical-type lithium metal secondary battery, the cathode active material layer 21B of the cathode 21 includes the lithium-oxygen-containing compound, and the electrolytic solution includes the boron-nitrogen-containing anion. Accordingly, superior battery characteristics are achieved for a reason similar to the reason for the lithium ion secondary battery. Functions and effects other than the above are similar to those of the lithium ion secondary battery.

It is to be noted that the configuration of the lithium metal secondary battery described above is not limitedly applied to a cylindrical-type secondary battery, and may be applied to a laminated-film-type secondary battery. A similar effect is achieved also in this case.

[2. Applications of Secondary Battery]

Next, description is provided of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power accumulation, or the like. The secondary battery used as an electric power source may be a main electric power source (an electric power source used preferentially), or may be an auxiliary electric power source (an electric power source used instead of a main electric power source or used being switched from the main electric power source). In the case where the secondary battery is used as the auxiliary electric power source, the kind of the main electric power source is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a mobile lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for accumulating electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, since superior battery characteristics are demanded, performance is effectively improved with the use of the secondary battery according to the embodiment of the present application. It is to be noted that the battery pack is an electric power source using secondary batteries, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is accumulated in the secondary battery as an electric power storage source, and therefore, home electric products and the like become usable with the use of the accumulated electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description is specifically given of some application examples of the secondary battery. It is to be noted that the configurations of the respective application examples described below are mere examples, and may be changed as appropriate.

[2-1. Battery Pack]

Figure 5:
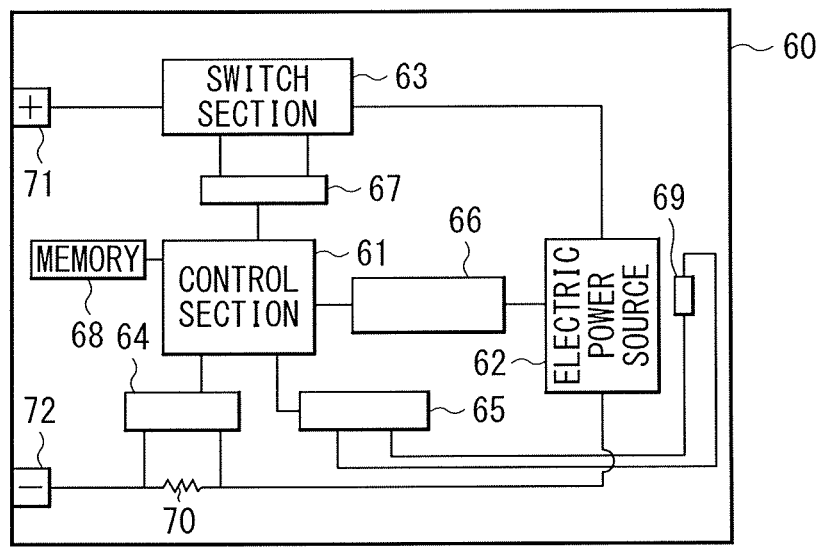
FIG. 5 is a block diagram illustrating a configuration of an application example (a battery pack) of the secondary battery.

FIG. 5 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may be made, for example, of a plastic material or the like.

The control section 61 controls operation of the whole battery pack (including a used state of the electric power source 62), and may include, for example, a central processing unit (CPU) and/or the like. The electric power source 62 includes one or more secondary batteries of an embodiment of the present application. The electric power source 62 may be, for example, an assembled battery including two or more secondary batteries. A connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (a charge control switch) in the case where, for example, the battery voltage reaches an overcharge detection voltage. Accordingly, in the electric power source 62, only discharge is allowed to be performed through the discharging diode. It is to be noted that, for example, in the case where a large current flows at the time of charge, the switch control section 67 blocks the charge current.

Further, the switch control section 67 causes a discharge current to be prevented from flowing in the current path of the electric power source 62 by disconnecting the switch section 63 (a discharge control switch) in the case where, for example, the battery voltage reaches an overdischarge detection voltage. Accordingly, in the electric power source 62, only charge is allowed to be performed through the charging diode. It is to be noted that, for example, in the case where a large current flows at the time of discharge, the switch control section 67 blocks the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM as a non-volatile memory, or the like. The memory 68 may store, for example, numerical values calculated by the control section 61 and information of the secondary battery measured in a manufacturing step (such as an internal resistance in the initial state). It is to be noted that, in the case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged through the cathode terminal 71 and the anode terminal 72.

[2-2. Electric Vehicle]

Figure 6:
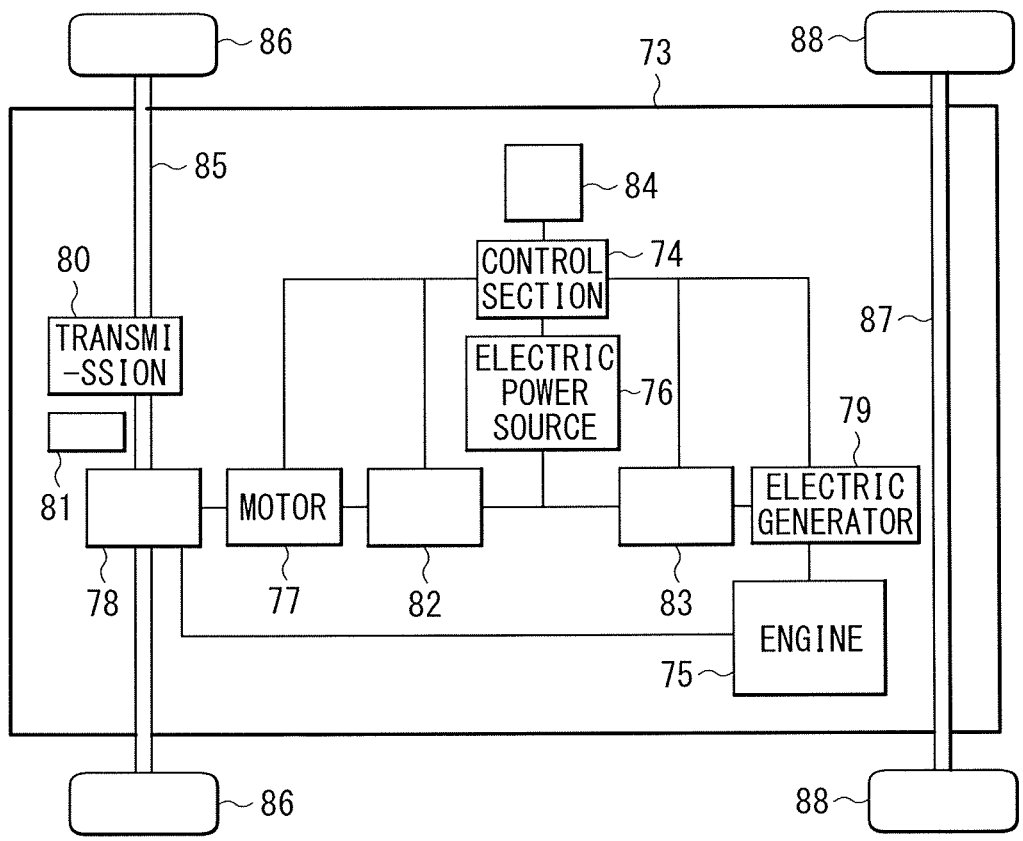
FIG. 6 is a block diagram illustrating a configuration of an application example (an electric vehicle) of the secondary battery.

FIG. 6 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. With the use of the torque, the electric generator 79 generates alternating-current electric power. The generated alternating-current electric power is converted into direct-current electric power through the inverter 83, and the converted power is accumulated in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. It may be preferable that the alternating-current electric power is converted into direct-current electric power through the inverter 82, and the direct-current regenerative electric power is accumulated in the electric power source 76.

The control section 74 controls operations of the whole electric vehicle, and, for example, may include a CPU and/or the like. The electric power source 76 includes one or more secondary batteries of an embodiment of the present application. Alternatively, the electric power source 76 may be connected to an external electric power source, and electric power may be accumulated by receiving the electric power from the external electric power source. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (an electric automobile) that operates with the use of only the electric power source 76 and the motor 77 without using the engine 75.

[2-3. Electric Power Storage System]

Figure 7:
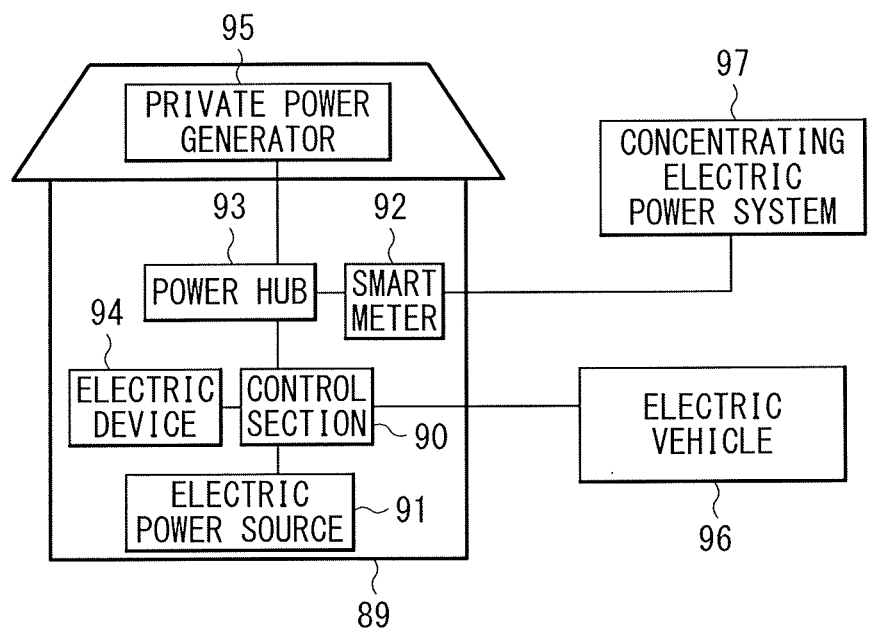
FIG. 7 is a block diagram illustrating a configuration of an application example (an electric power storage system) of the secondary battery.

FIG. 7 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connectable to an electric vehicle 96 parked outside the house 89. Further, for example, the electric power source 91 may be connected to a private power generator 95 arranged in the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries of an embodiment of the present application. The smart meter 92 may be, for example, an electric power meter, compatible with a network, arranged in the house 89 demanding electric power, and may be communicable with an electric power supplier. Accordingly, for example, while the smart meter 92 communicates with outside, the smart meter 92 controls the balance between supply and demand in the house 89, and thereby allows effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power stored in the electric power source 91 is supplied to the electric device 94 and the electric vehicle 96 according to an instruction of the control section 90. Therefore, the electric device 94 becomes operable, and the electric vehicle 96 becomes chargeable. That is, the electric power storage system is a system capable of accumulating and supplying electric power in the house 89 with the use of the electric power source 91.

The electric power stored in the electric power source 91 is arbitrarily usable. Therefore, for example, electric power is allowed to be accumulated in the electric power source 91 from the concentrating electric power system 97 in the middle of the night when an electric rate is inexpensive, and the electric power accumulated in the electric power source 91 is allowed to be used during daytime hours when an electric rate is expensive.

It is to be noted that the foregoing electric power storage system may be provided for each household (family unit), or may be provided for a plurality of households (family units).

[2-4. Electric Power Tool]

Figure 8:
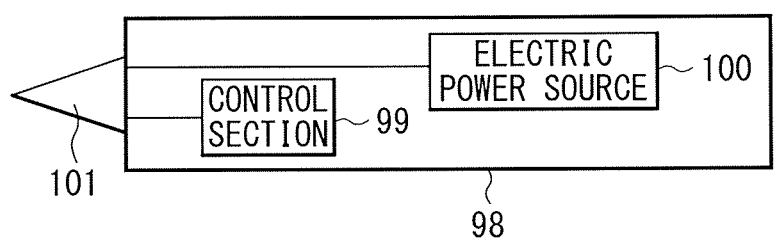
FIG. 8 is a block diagram illustrating a configuration of an application example (an electric power tool) of the secondary battery.

FIG. 8 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries of an embodiment of the present application. The control section 99 allows electric power to be supplied from the electric power source 100 to the drill section 101 according to operation of an unillustrated operation switch.

EXAMPLES

Specific examples of the embodiment of the present application are described in detail.

Examples 1-1 to 1-32

The laminated-film-type lithium ion secondary batteries illustrated in FIGS. 3 and 4 were fabricated by the following procedures.

When fabricating the cathode 33, first, 90 parts by mass of a cathode active material ($LiCoO_2$ which is the lithium-oxygen-containing compound), 5 parts by mass of a cathode binder (polyvinylidene fluoride), and 5 parts by mass of a cathode electric conductor (Ketjen black) were mixed to obtain a cathode mixture. Subsequently, the cathode mixture was dispersed in an organic solvent (N-methyl-2-pyrrolidone) to obtain cathode mixture slurry. Subsequently, the cathode mixture slurry was uniformly applied onto both surfaces of the cathode current collector 33A (an aluminum foil being 15 μm thick), and the applied cathode mixture slurry was dried to form the cathode active material layer 33B. Lastly, after the cathode active material layer 33B was compression-molded with the use of a roll pressing machine, the cathode current collector 33A on which the cathode active material layer 33B was formed was cut into a strip-like shape (48 mm×300 mm).

When fabricating the anode 34, first, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, the anode mixture slurry was uniformly applied onto both surfaces of the anode current collector 34A (a copper foil being 15 μm thick), and the applied anode mixture slurry was dried to form the anode active material layer 34B. Lastly, after the anode active material layer 34B was compression-molded with the use of a roll pressing machine, the anode current collector 34A on which the anode active material layer 34B was formed was cut into a strip-like shape (50 mm×310 mm).

When preparing the electrolytic solution, the first electrolyte salt, the second electrolyte salt, or both were dissolved in a mixture solvent. The first electrolyte salt is a salt that includes the boron-nitrogen-containing anion, and the second electrolyte salt is a salt that does not include the boron-nitrogen-containing anion. As the mixture solvent, ethylene carbonate (EC) and diethyl carbonate (DEC) were used. A composition of the mixture solvent was set as EC:DEC=50:50 in weight ratio. The kind and the content (mol/kg) of each of the first electrolyte salt and the second electrolyte salt was as shown in Tables 1 and 2.

When assembling the secondary battery, the cathode lead 31 made of aluminum was welded to the cathode current collector 33A of the cathode 33, and the anode lead 32 made of copper was welded to the anode current collector 34A of the anode 34. Subsequently, the cathode 33 and the anode 34 were laminated with the separator 35 (a micro-porous polyethylene film being 25 μm thick) in between and were spirally wound in a longitudinal direction to fabricate the spirally wound electrode body 30, and the protective tape 37 was attached to the outermost periphery thereof. Subsequently, after the spirally wound electrode body 30 was sandwiched between two pieces of film-like outer package members 40, the outermost peripheries of three sides of the outer package members 40 were bonded by a thermal fusion bonding method, and the outer package members 40 were made into a pouch-like shape. The outer package members 40 were each a moisture-resistant aluminum laminated film in which a nylon film being 25 μm thick, an aluminum foil being 40 μm thick, and a polypropylene film being 30 μm thick were laminated in order from the outer side. Lastly, the electrolytic solution was injected inside the outer package members 40, and the separator 35 was impregnated with the injected electrolytic solution. Thereafter, last one side of the outer package members 40 was bonded by a thermal fusion bonding method under a reduced pressure environment. A composition of the electrolytic solution was as shown in Tables 5.

Cycle characteristics, conservation characteristics, and load characteristics were examined as battery characteristics of the secondary batteries, and results shown in Tables 1 and 2 were obtained.

When examining the cycle characteristics, in order to stabilize the battery state, the secondary battery was charged and discharged for 1 cycle under an ambient temperature environment (23 deg C.). Thereafter, the secondary battery was charged and discharged for another cycle under a high temperature environment (60 deg C.), and discharge capacity was measured. Subsequently, the secondary battery was charged and discharged under the same environment (60 deg C.) until the total cycle number reached 100 cycles, and the discharge capacity was measured. Based on this result, cycle retention rate (%)=(discharge capacity at the 100th cycle/discharge capacity at the 2nd cycle)×100 was calculated. At the time of charge, the secondary battery was charged at a current of 0.2 C until a voltage reached 4.2 V, and was further charged at the voltage of 4.2 V until the current reached 0.05 C. At the time of discharge, the secondary battery was discharged at the current of 0.2 C until the voltage reached 2.5 V. "0.2 C" is a value of a current by which the battery capacity (theoretical capacity) is completely discharged in five hours. "0.05 C" is a value of a current by which the battery capacity is completely discharged in twenty hours.

When examining the conservation characteristics, the secondary battery the battery state of which had been stabilized by a procedure similar to that in the case of examining the cycle characteristics was used. The secondary battery was charged and discharged for 1 cycle under an ambient temperature environment (23 deg C.), and the discharge capacity was measured. Subsequently, the secondary battery in a recharged state was conserved in a constant-temperature bath (80 deg C.) for ten days. Thereafter, the secondary battery was discharged under the ambient temperature environment, and the discharge capacity was measured. Based on this result, conservation retention rate (%)=(discharge capacity after conservation/discharge capacity before conservation)×100 was calculated. The charge and discharge conditions were set to be similar to those in the case of examining the cycle characteristics.

When examining the load characteristics, the secondary battery the battery state of which had been stabilized by a procedure similar to that in the case of examining the cycle characteristics was used. The secondary battery was charged and discharged for 1 cycle under an ambient temperature environment (23 deg C.), and the discharge capacity was measured. Subsequently, the secondary battery was charged and discharged under a low temperature environment (−10 deg C.) until the total cycle number reached 100 cycles, and the discharge capacity was measured. Based on this result, load retention rate (%)=(discharge capacity at the 100th cycle/discharge capacity at the 2nd cycle)×100 was calculated. The charge and discharge conditions were set to be similar to those in the case of examining the cycle characteristics except that the current at the time of discharge was changed to 1 C. "1 C" is a value of a current by which the battery capacity is completely discharged in one hour.

TABLE 1

Cathode active material: $LiCoO_2$, Anode active material: Graphite, Upper-limit voltage = 4.35 V

| Example | First electrolyte salt Kind | First electrolyte salt Content (mol/kg) | Second electrolyte salt Kind | Second electrolyte salt Content (mol/kg) | Cycle retention rate (%) | Conservation retention rate (%) | Load retention rate (%) |
|---|---|---|---|---|---|---|---|
| 1-1 | $LiB(CN)_3(CF_3)$ | 0.01 | $LiPF_6$ | 0.99 | 58 | 78 | 63 |
| 1-2 | | 0.05 | | 0.95 | 62 | 80 | 65 |
| 1-3 | | 0.1 | | 0.9 | 66 | 85 | 68 |
| 1-4 | | 0.2 | | 0.8 | 70 | 86 | 68 |
| 1-5 | | 0.5 | | 0.5 | 68 | 85 | 64 |
| 1-6 | | 1 | | 0 | 63 | 82 | 58 |
| 1-7 | $LiB(CN)_2F_2$ | 0.01 | $LiPF_6$ | 0.99 | 55 | 73 | 58 |
| 1-8 | | 0.05 | | 0.95 | 58 | 75 | 62 |
| 1-9 | | 0.1 | | 0.9 | 60 | 78 | 65 |
| 1-10 | | 0.2 | | 0.8 | 62 | 80 | 65 |
| 1-11 | | 0.5 | | 0.5 | 64 | 78 | 60 |
| 1-12 | | 1 | | 0 | 60 | 77 | 55 |
| 1-13 | $LiB(NC)(CF_3)_3$ | 0.01 | $LiPF_6$ | 0.99 | 53 | 72 | 57 |
| 1-14 | | 0.05 | | 0.95 | 55 | 74 | 60 |
| 1-15 | | 0.1 | | 0.9 | 57 | 77 | 62 |

TABLE 1-continued

Cathode active material: LiCoO$_2$, Anode active material: Graphite, Upper-limit voltage = 4.35 V

| Example | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|
| 1-16 | | 0.2 | | 0.8 | 58 | 77 | 62 |
| 1-17 | | 0.5 | | 0.5 | 56 | 74 | 58 |
| 1-18 | | 1 | | 0 | 55 | 72 | 52 |
| 1-19 | LiB(CN)F(CF$_3$)$_2$ | 0.01 | LiPF$_6$ | 0.99 | 60 | 79 | 64 |
| 1-20 | | 0.05 | | 0.95 | 64 | 82 | 67 |
| 1-21 | | 0.1 | | 0.9 | 68 | 86 | 70 |
| 1-22 | | 0.2 | | 0.8 | 72 | 88 | 70 |
| 1-23 | | 0.5 | | 0.5 | 70 | 85 | 66 |
| 1-24 | | 1 | | 0 | 65 | 82 | 62 |

TABLE 2

Cathode active material: LiCoO$_2$, Anode active material: Graphite, Upper-limit voltage = 4.35 V

| Example | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|
| 1-25 | LiB(CN)(CF$_3$)$_3$ | 0.1 | LiPF$_6$ | 0.9 | 62 | 82 | 64 |
| 1-26 | LiB(CN)$_3$(C$_2$F$_5$) | 0.1 | LiPF$_6$ | 0.9 | 68 | 88 | 70 |
| 1-27 | LiB(CN)(C$_2$F$_5$)$_3$ | 0.1 | LiPF$_6$ | 0.9 | 60 | 80 | 62 |
| 1-28 | LiB(CN)$_3$(C$_6$F$_5$) | 0.1 | LiPF$_6$ | 0.9 | 58 | 80 | 62 |
| 1-29 | LiB(CN)(C$_6$F$_5$)$_3$ | 0.1 | LiPF$_6$ | 0.9 | 55 | 78 | 58 |
| 1-30 | LiB(CN)$_3$F | 0.1 | LiPF$_6$ | 0.9 | 63 | 80 | 65 |
| 1-31 | LiB(NC)$_3$(CF$_3$) | 0.1 | LiPF$_6$ | 0.9 | 55 | 75 | 55 |
| 1-32 | — | — | LiPF$_6$ | 1 | 52 | 71 | 43 |

In the case where the cathode active material layer 33B of the cathode 33 included the lithium-oxygen-containing compound (LiCoO$_2$), the cycle retention rate, the conservation retention rate, and the load retention rate were largely varied depending on the kind of the anion included in the electrolytic solution.

In detail, in the case where the electrolytic solution included the boron-nitrogen-containing anion (Examples 1-1 to 1-31), the cycle retention rate, the conservation retention rate, and the load retention rate were all increased, compared to the case where the electrolytic solution did not include the boron-nitrogen-containing anion (Example 1-32).

In this case, in particular, high cycle retention rate, high conservation retention rate, and high load retention rate were obtained even when the electrolytic solution included only the boron-nitrogen-containing anion (Example 1-6, etc.). Moreover, in the case where the first electrolyte salt including the boron-nitrogen-containing anion and the second electrolyte salt not including the boron-nitrogen-containing anion were included in the electrolytic solution, when the ratio of the first electrolyte salt was from 1% to 50%, favorable cycle retention rate, favorable conservation retention rate, and favorable load retention rate were obtained. In this case, when the ratio of the first electrolyte salt was from 5% to 50%, further was from 10% to 50%, the cycle retention rate, the conservation retention rate, and the load retention rate were all increased more.

Examples 2-1 to 2-20

As shown in Table 3, secondary batteries were fabricated by a similar procedure except that only the first electrolyte salt including the boron-nitrogen-containing anion was used and the content of the first electrolyte salt was changed, and battery characteristics were examined.

TABLE 3

Cathode active material: LiCoO$_2$, Anode active material: Graphite, Upper-limit voltage = 4.35 V

| Example | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|
| 2-1 | LiB(CN)$_3$(CF$_3$) | 0.5 | — | — | 54 | 75 | 47 |
| 2-2 | | 0.8 | | | 58 | 80 | 54 |
| 1-6 | | 1 | | | 63 | 82 | 58 |
| 2-3 | | 1.2 | | | 63 | 82 | 58 |
| 2-4 | | 1.5 | | | 60 | 80 | 55 |

TABLE 3-continued

Cathode active material: LiCoO$_2$, Anode active material: Graphite, Upper-limit voltage = 4.35 V

| Example | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|
| 2-5 | | 2 | | | 57 | 78 | 48 |
| 2-6 | LiB(CN)$_2$F$_2$ | 0.5 | — | — | 53 | 74 | 46 |
| 2-7 | | 0.8 | | | 58 | 75 | 48 |
| 1-12 | | 1 | | | 60 | 77 | 55 |
| 2-8 | | 1.2 | | | 60 | 78 | 55 |
| 2-9 | | 1.5 | | | 58 | 75 | 53 |
| 2-10 | | 2 | | | 55 | 73 | 45 |
| 2-11 | LiB(NC)(CF$_3$)$_3$ | 0.5 | — | — | 53 | 72 | 44 |
| 2-12 | | 0.8 | | | 55 | 72 | 46 |
| 1-18 | | 1 | | | 55 | 72 | 52 |
| 2-13 | | 1.2 | | | 55 | 73 | 52 |
| 2-14 | | 1.5 | | | 56 | 73 | 50 |
| 2-15 | | 2 | | | 54 | 73 | 46 |
| 2-16 | LiB(CN)F(CF$_3$)$_2$ | 0.5 | — | — | 58 | 75 | 50 |
| 2-17 | | 0.8 | | | 60 | 78 | 55 |
| 1-24 | | 1 | | | 65 | 82 | 62 |
| 2-18 | | 1.2 | | | 66 | 82 | 64 |
| 2-19 | | 1.5 | | | 64 | 80 | 63 |
| 2-20 | | 2 | | | 60 | 79 | 60 |
| 1-32 | — | — | LiPF$_6$ | 1 | 52 | 71 | 43 |

Even in the case where the content of the first electrolyte salt including the boron-nitrogen-containing anion was changed (Examples 2-1 to 2-20), the cycle retention rate, the conservation retention rate, and the load retention rate were all increased, compared to the case where the first electrolyte salt including the boron-nitrogen-containing anion was not used (Example 1-32).

In particular, in the case where the first electrolyte salt including the boron-nitrogen-containing anion was used, when the content of the first electrolyte salt was from 0.5 mol/kg to 2 mol/kg, high cycle retention rate, high conservation retention rate, and high load retention rate were obtained. Further, when the content of the first electrolyte salt was from 0.8 mol/kg to 1.5 mol/kg, the cycle retention rate, the conservation retention rate, and the load retention rate were all increased more.

Examples 3-1 to 3-14

As shown in Table 4, secondary batteries were fabricated by a similar procedure except that the kind of the second electrolyte salt was changed, and battery characteristics were examined. As the second electrolyte salt, lithium tetrafluoroborate (LiBF$_4$) and bis(fluorosulfonyl) imide lithium (LiN(FSO$_2$)$_2$) were used.

TABLE 4

Cathode active material: LiCoO$_2$, Anode active material: Graphite, Upper-limit voltage = 4.35 V

| Example | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|
| 3-1 | LiB(CN)$_3$(CF$_3$) | 0.01 | LiBF$_4$ | 0.99 | 54 | 72 | 48 |
| 3-2 | | 0.05 | | 0.95 | 58 | 78 | 50 |
| 3-3 | | 0.1 | | 0.9 | 60 | 80 | 52 |
| 3-4 | | 0.2 | | 0.8 | 62 | 82 | 54 |
| 3-5 | | 0.5 | | 0.5 | 64 | 84 | 55 |
| 3-6 | | 1 | | 0 | 63 | 82 | 58 |
| 3-7 | LiB(CN)$_3$(CF$_3$) | 0.01 | LiN(FSO$_2$)$_2$ | 0.99 | 55 | 78 | 60 |
| 3-8 | | 0.05 | | 0.95 | 60 | 80 | 62 |
| 3-9 | | 0.1 | | 0.9 | 62 | 82 | 65 |
| 3-10 | | 0.2 | | 0.8 | 66 | 84 | 68 |
| 3-11 | | 0.5 | | 0.5 | 67 | 85 | 64 |
| 3-12 | | 1 | | 0 | 63 | 82 | 58 |
| 3-13 | — | — | LiBF$_4$ | 1 | 30 | 56 | 28 |
| 3-14 | — | — | LiN(FSO$_2$)$_2$ | 1 | 45 | 72 | 45 |

Even when the kind of the second electrolyte salt was changed, results similar to those shown in Tables 1 and 2 were obtained. Specifically, in the case where the electrolytic solution included the boron-nitrogen-containing anion (Examples 3-1 to 3-12), the cycle retention rate, the conservation retention rate, and the load retention rate were all increased, compared to the case where the electrolytic solution did not include the boron-nitrogen-containing anion (Examples 3-13 and 3-14).

Examples 4-1 to 4-20

As shown in Table 5, secondary batteries were fabricated by a similar procedure except that the composition of the mixture solvent was changed, and battery characteristics were examined.

In this case, propyl carbonate (PC), dimethyl carbonate (DMC), or ethyl methyl carbonate (EMC) was used instead of diethyl carbonate, and PC was added to the mixture solvent as necessary. A composition of the three-component-based mixture solvent was set as EC:DEC:PC=50:50:50 or EC:EMC:PC=50:50:50.

Moreover, the electrolytic solution was prepared, and an additive was added to the prepared electrolytic solution. The kind of the additive was as follows. As the unsaturated cyclic ester carbonate, vinylene carbonate (VC), vinyl ethylene carbonate (VEC), and methylene ethylene carbonate (MEC) were used. As the halogenated ester carbonate, 4-fluoro-1,3-dioxolane-2-one (FEC) and 4,5-difluoro-1,3-dioxolane-2-one (DFEC) were used. As the monosulfonate ester, propane sultone (PS) and propene sultone (PRS) were used. As the disulfonate ester, a compound represented by Formula (21-2) (OSAH) was used. As the acid anhydride, succinic anhydride (SA) and propane disulfonic anhydride (PSAH) were used. As the dicyano compound, succinonitrile (SN) was used. As the diisocyanate compound, hexamethylene diisocyanate (HMI) was used. Other than above, as an additional electrolyte salt, lithium tetrafluoroborate (LiBF$_4$), bis(fluorosulfonyl) imide lithium (LiFSI), and a compound (LiBOB) represented by Formula (22-1) were used.

A content of each of VC, VEC, MEC, FEC, and DFEC in the electrolytic solution was 2 wt %, a content of each of PS, PRS, SA, PSAH, OSAH, SN, and HMI in the electrolytic solution was 0.5 wt %, and a content of each of LiBF$_4$, LiFSI, and LiBOB in the electrolytic solution was 0.05 wt %.

TABLE 5

Cathode active material: LiCoO$_2$, Anode active material: Graphite, Upper-limit voltage = 4.35 V

| Example | Non-aqueous solvent | First electrolyte salt Kind | Content (mol/kg) | Second electrolyte salt Kind | Content (mol/kg) | Cycle retention rate (%) | Conservation retention rate (%) | Load retention rate (%) |
|---|---|---|---|---|---|---|---|---|
| 4-1 | EC + PC | LiB(CN)$_3$(CF$_3$) | 0.1 | LiPF$_6$ | 0.9 | 63 | 85 | 60 |
| 4-2 | EC + DEC + PC | | | | | 66 | 88 | 70 |
| 4-3 | EC + EMC + PC | | | | | 68 | 88 | 74 |
| 4-4 | EC + DMC + PC | | | | | 72 | 85 | 78 |
| 4-5 | EC + EMC | | | | | 70 | 85 | 75 |
| 4-6 | EC + DEC   VC | | | | | 72 | 87 | 66 |
| 4-7 |         VEC | | | | | 70 | 88 | 68 |
| 4-8 |         MEC | | | | | 73 | 88 | 68 |
| 4-9 |         FEC | | | | | 75 | 85 | 68 |
| 4-10 |        DFEC | | | | | 72 | 85 | 66 |
| 4-11 |        PS | | | | | 68 | 92 | 70 |
| 4-12 |        PRS | | | | | 68 | 92 | 70 |
| 4-13 |        SA | | | | | 68 | 88 | 64 |
| 4-14 |        PSAH | | | | | 72 | 93 | 74 |
| 4-15 |        OSAH | | | | | 68 | 90 | 70 |
| 4-16 |        SN | | | | | 65 | 90 | 66 |
| 4-17 |        HMI | | | | | 66 | 88 | 64 |
| 4-18 |        LiBF$_4$ | | | | | 66 | 86 | 68 |
| 4-19 |        LiFSI | | | | | 66 | 90 | 68 |
| 4-20 |        LiBOB | | | | | 68 | 89 | 65 |
| 1-32 | EC + DEC | — | — | LiPF$_6$ | 0.9 | 52 | 71 | 43 |

Even when the additive was added to the electrolytic solution, results similar to those shown in Tables 1 and 2 were obtained. Specifically, in the case where the electrolytic solution included the boron-nitrogen-containing anion (Examples 4-1 to 4-20), the cycle retention rate, the conservation retention rate, and the load retention rate were all increased, compared to the case where the electrolytic solution did not include the boron-nitrogen-containing anion (Example 1-32).

Examples 5-1 to 5-7

As shown in Table 6, secondary batteries were fabricated by a similar procedure except that the configuration of each of the cathode 33 and the anode 34 was changed, and battery characteristics were examined.

When fabricating the cathode 33, first, 50 parts by mass of the cathode active material (sulfur powder available from Kojundo Chemical Lab. Co., Ltd.), 10 parts by mass of the cathode binder (polytetrafluoroethylene), and 40 parts by mass of the cathode electric conductor (Ketjen black ECP600JD available from Lion Corporation) were mixed to obtain a cathode mixture. The sulfur powder had purity of 99.99% and an average particle size of 75 m or smaller. Subsequently, ethanol was added to the mixture, and the mixture was sufficiently kneaded. Specifically, the mixture was kneaded until the mixture became viscous. Lastly, the kneaded material was formed into a sheet-like shape, and the formed material was dried.

As the anode 34, a lithium metal plate (being 100 μm thick) was used.

When examining the battery characteristics of the secondary battery, the secondary battery was discharged until the voltage reached a discharge final voltage of 1 V (for lithium metal), and was charged until the voltage reached a charge final voltage of 3 V (for lithium metal).

TABLE 6

Cathode active material: Sulfur, Anode active material: Lithium metal, Upper-limit voltage = 3 V

| Example | First electrolyte salt Kind | First electrolyte salt Content (mol/kg) | Second electrolyte salt Kind | Second electrolyte salt Content (mol/kg) | Cycle retention rate (%) | Conservation retention rate (%) | Load retention rate (%) |
|---|---|---|---|---|---|---|---|
| 5-1 | LiB(CN)$_3$(CF$_3$) | 0.01 | LiPF$_6$ | 0.99 | 5 | 20 | 40 |
| 5-2 |  | 0.05 |  | 0.95 | 3 | 20 | 35 |
| 5-3 |  | 0.1 |  | 0.9 | 0 | 0 | 30 |
| 5-4 |  | 0.2 |  | 0.8 | 0 | 0 | 20 |
| 5-5 |  | 0.5 |  | 0.5 | 0 | 0 | 5 |
| 5-6 |  | 1 |  | 0 | 0 | 0 | 0 |
| 5-7 | — | — | LiPF$_6$ | 1 | 10 | 30 | 50 |

When the kind of the cathode active material was changed, results different from those shown in Tables 1 and 2 were obtained.

In detail, in the case where the material (sulfur) other than the lithium-oxygen-containing compound was used as the cathode active material, when the electrolytic solution included the boron-nitrogen-containing anion (Examples 5-1 to 5-6), the cycle retention rate, the conservation retention rate, and the load retention rate were all decreased, compared to the case where the electrolytic solution did not include the boron-nitrogen-containing anion.

This result shows the following tendencies. In the case where the cathode active material is a material other than the lithium-oxygen-containing compound, because the electrolytic solution is naturally less likely to be decomposed at the time of charge and discharge, the decomposition reaction of the electrolytic solution is not improved even the electrolytic solution includes the boron-nitrogen-containing anion. Actually, when the electrolytic solution includes the boron-nitrogen-containing anion, the cycle retention rate, the conservation retention rate, and the load retention rate are all decreased. On the other hand, in the case where the cathode active material is the lithium-oxygen-containing compound, because the electrolytic solution is naturally likely to be decomposed at the time of charge and discharge, the decomposition reaction of the electrolytic solution is improved when the electrolytic solution includes the boron-nitrogen-containing anion. In other words, the boron-nitrogen-containing anion exhibits the decomposition suppression function for the electrolytic solution when the cathode active material is the lithium-oxygen-containing compound. Accordingly, the cycle retention rate, the conservation retention rate, and the load retention rate are all increased. Consequently, in order to utilize the decomposition suppression function of the boron-nitrogen-containing anion, it is useless to use a material other than the lithium-oxygen-containing compound as the cathode active material, and it may be necessary to use the lithium-oxygen-containing compound.

Based on the results shown in Tables 1 to 6, in the case where the cathode included the lithium-oxygen-containing compound, when the electrolytic solution included the boron-nitrogen-containing anion, the cycle characteristics, the conservation characteristics, and the load characteristics were all improved. Accordingly, superior battery characteristics were achieved.

The present application has been described above referring to some embodiments and Examples. However, the present application is not limited to the examples described in the embodiments and Examples, and may be variously modified. For example, the description has been given with the specific examples of the case in which the battery structure of the secondary battery is of a cylindrical type or a laminated film type and the electrode structure has a spirally wound structure. However, applicable structures are not limited thereto. The secondary battery of the present application is similarly applicable to a case where the secondary battery has other battery structure such as a square type, a coin type, and a button type, and to a case where the electrode structure has other structure such as a laminated structure.

Moreover, in the above embodiments and Examples, description has been provided of the case where lithium is used as the electrode reactant; however, this is not limitative. For example, the electrode reactant may be any of other Group 1 elements in the long form of the periodic table such as sodium (Na) and potassium (K), Group 2 elements in the long form of the periodic table such as magnesium and calcium, and other light metal such as aluminum. Alternatively, the electrode reactant may be alloy that includes one or more of the series of elements described above.

It is to be noted that the effects described herein are mere examples. The effects of the present application are not limited thereto, and may include other effect.

It is possible to achieve at least the following configurations from the above-described example embodiments and the modifications of the technology.

[1] A secondary battery including:
  a cathode including a lithium-oxygen-containing compound;
  an anode; and
  non-aqueous electrolytic solution including one or more first anions represented by Formula (1), $$B(XY)_xF_yR_z^-  \quad (1)$$

where X is one of a divalent chain hydrocarbon group, a divalent fluorinated chain hydrocarbon group, and nothing,
  Y is one of a cyano group (—C≡N) and an isocyano group (—N$^+$≡C$^-$),
  R is one of a monovalent fluorinated chain hydrocarbon group and a monovalent fluorinated cyclic hydrocarbon group, and
  x to z are integers that satisfy x>0, y≥0, z≥0, (x+y+z)=4, and (y+z)>0.

[2] The secondary battery according to [1], wherein the divalent chain hydrocarbon group is an alkylene group, the divalent fluorinated chain hydrocarbon group is a group obtained by substituting one or more fluorine groups (—F) for one or more hydrogen groups (—H) in the alkylene group, the monovalent fluorinated chain hydrocarbon group is one of a group obtained by substituting one or more fluorine groups for one or more hydrogen groups in an alkyl group, a group obtained by substituting one or more fluorine groups for one or more hydrogen groups in an alkenyl group, and a group obtained by substituting one or more fluorine groups for one or more hydrogen groups in an alkynyl group, and the monovalent fluorinated cyclic hydrocarbon group is one of a group obtained by substituting one or more fluorine groups for one or more hydrogen groups in an aryl group, and a group obtained by substituting one or more fluorine groups for one or more hydrogen groups in a cycloalkyl group.

[3] The secondary battery according to [2], wherein
the alkylene group has carbon number from 1 to 4 both inclusive,
the alkyl group has carbon number from 1 to 4 both inclusive,
the alkenyl group and the alkynyl group each have carbon number from 2 to 4 both inclusive, and
the aryl group and the cycloalkyl group each have carbon number from 6 to 18 both inclusive.

[4] The secondary battery according to any one of [1] to [3], wherein
the divalent fluorinated chain hydrocarbon group is a perfluoroalkylene group,
the monovalent fluorinated chain hydrocarbon group is one of a perfluoroalkyl group, a perfluoroalkenyl group, and a perfluoroalkynyl group, and
the monovalent fluorinated cyclic hydrocarbon group is one of a perfluoroaryl group and a perfluorocycloalkyl group.

[5] The secondary battery according to any one of [1] to [4], wherein the one or more first anions include one or more of anions represented by respective Formulas (2) to (4), $$B(X1Y1)_{x1}R1_{z1}^{-} \qquad (2)$$

where X1 is one of a divalent chain hydrocarbon group, a divalent fluorinated chain hydrocarbon group, and nothing,
Y1 is one of a cyano group and an isocyano group,
R1 is one of a monovalent fluorinated chain hydrocarbon group and a monovalent fluorinated cyclic hydrocarbon group,
x1 and z1 are integers that satisfy x1>0, z1>0, and (x1+z1)=4, $$B(X2Y2)_{x2}F_{y2} \qquad (3)$$

where X2 is one of a divalent chain hydrocarbon group, a divalent fluorinated chain hydrocarbon group, and nothing,
Y2 is one of a cyano group and an isocyano group, and
x2 and y2 are integers that satisfy x2>0, y2>0, and (x2+y2)=4, $$B(X3Y3)_{x3}F_{y3}R3_{z3}^{-} \qquad (4)$$

where X3 is one of a divalent chain hydrocarbon group, a divalent fluorinated chain hydrocarbon group, and nothing,
Y3 is one of a cyano group and an isocyano group,
R3 is one of a monovalent fluorinated chain hydrocarbon group and a monovalent fluorinated cyclic hydrocarbon group,
x3 to z3 are integers that satisfy x3>0, y3>0, z3>0, and (x3+y3+z3)=4.

[6] The secondary battery according to [5], wherein
the anion represented by Formula (2) includes one or more of $B(CN)_3(CF_3)^-$, $B(CN)_2(CF_3)_2^-$, $B(CN)(CF_3)_3^-$, $B(CN)_3(C_2F_5)^-$, $B(CN)_2(C_2F_5)_2^-$, $B(CN)(C_2F_5)_3^-$, $B(CN)_3(C_6F_5)^-$, $B(CN)_2(C_6F_5)_2^-$, $B(CN)(C_6F_5)_3^-$, $B(NC)_3(CF_3)^-$, $B(NC)_2(CF_3)_2^-$, $B(NC)(CF_3)_3^-$, $B(NC)_3(C_2F_5)^-$, $B(NC)_2(C_2F_5)_2^-$, $B(NC)(C_2F_5)_3^-$, $B(NC)_3(C_6F_5)^-$, $B(NC)_2(C_6F_5)_2^-$, and $B(NC)(C_6F_5)_3^-$, the anion represented by Formula (3) includes one or more of $B(CN)_3F^-$, $B(CN)_2F_2^-$, $B(CN)F_3^-$, $B(NC)F_3^-$, $B(NC)_2F_2^-$, and $B(NC)_3F^-$, and the anion represented by Formula (4) includes one or more of $B(CN)_2F(CF_3)^-$, $B(CN)F_2(CF_3)^-$, $B(CN)F(CF_3)_2^-$, $B(CN)_2F(C_2F_5)^-$, $B(CN)F_2(C_2F_5)^-$, $B(CN)F(C_2F_5)_2^-$, $B(NC)_2F(CF_3)^-$, $B(NC)F_2(CF_3)^-$, $B(NC)F(CF_3)_2^-$, $B(NC)_2F(C_2F_5)^-$, $B(NC)F_2(C_2F_5)^-$, and $B(NC)F(C_2F_5)_2^-$.

[7] The secondary battery according to any one of [1] to [6], wherein the non-aqueous electrolytic solution includes alkali metal ion, alkaline-earth metal ion, or both as a cation.

[8] The secondary battery according to [7], wherein the cation includes lithium ion ($Li^+$).

[9] The secondary battery according to any one of [1] to [8], wherein
the non-aqueous electrolytic solution includes one or more second anions excluding the first anions, and
the one or more second anions each include fluorine (F) as a constituent element.

[10] The secondary battery according to [9], wherein the one or more second anions include one or more of hexafluorophosphate ion ($PF_6^-$), tetrafluoroborate ion ($BF_4^-$), hexafluoroarsenate ion ($AsF_6^-$), trifluoromethanesulfonic acid ion ($CF_3SO_3^-$), hexafluorosilicate ion ($Li_2SiF_6^-$), bis(fluorosulfonyl)imide ion ($N(FSO_2)_2^-$), and ions represented by respective Formulas (5) to (10),

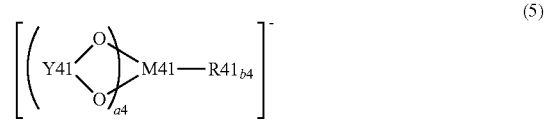

(5)

where M41 is one of transition metal elements, Group 13 elements, Group 14 elements, and Group 15 elements in long form of periodic table,
R41 is a halogen group,
Y41 is one of —C(=O)—R42-C(=O)—, —C(=O)—CR43$_2$-, and —C(=O)—C(=O)—,
R42 is one of an alkylene group, a halogenated alkylene group, an arylene group, and a halogenated arylene group,
R43 is one of an alkyl group, a halogenated alkyl group, an aryl group, and a halogenated aryl group,
a4 is an integer from 1 to 4 both inclusive, and
b4 is an integer of one of 0, 2, and 4,

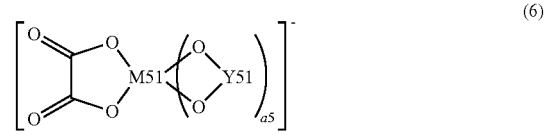

(6)

where X51 is one of Group 1 elements and Group 2 elements in the long form of the periodic table, M51 is one of transition metal elements, Group 13 elements, Group 14 elements, and Group 15 elements in the long form of the periodic table, Y51 is one of —C(=O)—(CR51$_2$)$_{b5}$—C(=O)—, —R53$_2$C—(CR52$_2$)$_{c5}$—C(=O)—, —R53$_2$C—(CR52$_2$)$_{c5}$—CR53$_2$-, —R53$_2$C—(CR52$_2$)$_{c5}$-S(=O)$_2$—, —S(=O)$_2$—(CR52$_2$)$_{d5}$—S(=O)$_2$—, and —C(=O)—(CR52$_2$)$_{d5}$—S(=O)$_2$, R51 and R53 are each one of a hydrogen group, an alkyl group, a halogen group, and a halogenated alkyl group, R51, R53, or both are each one of a halogen group and a halogenated alkyl group, R52 is one of a hydrogen group, an alkyl group, a halogen group, and a halogenated alkyl group, and a5 is an integer of one of 1 and 2,

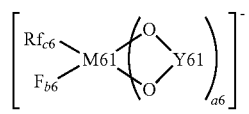 (7)

where X61 is one of Group 1 elements and Group 2 elements in the long form of the periodic table, M61 is one of transition metal elements, Group 13 elements, Group 14 elements, and Group 15 elements in the long form of the periodic table, Rf is one of a fluorinated alkyl group and a fluorinated aryl group, and has carbon number from 1 to 10 both inclusive, Y61 is one of —C(=O)—(CR61$_2$)$_{d6}$—C(=O)—, —R62$_2$C—(CR61$_2$)$_{d6}$—C(=O)—, —R62$_2$C—(CR61$_2$)$_{d6}$—CR62$_2$-, —R62$_2$C—(CR61$_2$)$_{d6}$—S(=O)$_2$—, —S(=O)$_2$—(CR61$_2$)$_{e6}$—S(=O)$_2$—, and —C(=O)—(CR61$_2$)$_{e6}$—S(=O)$_2$—, R61 is one of a hydrogen group, an alkyl group, a halogen group, and a halogenated alkyl group, R62 is one of a hydrogen group, an alkyl group, a halogen group, and a halogenated alkyl group, at least one of R62s is one of the halogen group and the halogenated alkyl group, a6 is an integer of one of 1 and 2, and b6 and c6 are each an integer from 1 to 4 both inclusive, N(C$_m$F$_{2m+1}$SO$_2$)(C$_n$F$_{2n+1}$SO$_2$)$^-$ (8)

where m and n are each an integer of 1 or larger,

 (9)

where R71 is a linear or branched perfluoroalkylene group having carbon number from 2 to 4 both inclusive, C(C$_p$F$_{2p+1}$SO$_2$)(C$_q$F$_{2q+1}$SO$_2$)(C$_r$F$_{2r+1}$SO$_2$)$^-$ (10)

where p, q, and r are each an integer of 1 or larger.

[11] The secondary battery according to [10], wherein
the anion represented by Formula (5) includes one or more of anions represented by respective Formulas (5-1) to (5-5), the anion represented by Formula (6) includes one or more of anions represented by respective Formulas (6-1) to (6-8), the anion represented by Formula (7) includes an anion represented by Formula (7-1), the anion represented by Formula (8) includes one or more of bis(trifluoromethanesulfonyl) imide ion (N(CF$_3$SO$_2$)$_2^-$), bis(pentafluoroethanesulfonyl) imide ion (N(C$_2$F$_5$SO$_2$)$_2^-$), (trifluoromethanesulfonyl) (pentafluoroethanesulfonyl) imide ion (N(CF$_3$SO$_2$)(C$_2$F$_5$SO$_2$)$^-$), (trifluoromethanesulfonyl) (heptafluoropropanesulfonyl) imide ion (N(CF$_3$SO$_2$)(C$_3$F$_7$SO$_2$)$^-$), and (trifluoromethanesulfonyl) (nonafluorobutanesulfonyl) imide ion (N(CF$_3$SO$_2$)(C$_4$F$_9$SO$_2$)$^-$), the anion represented by Formula (9) includes one or more anions represented by respective Formulas (9-1) to (9-4), and the anion represented by Formula (10) includes tris(trifluoromethanesulfonyl) methide ion (C(CF$_3$SO$_2$)$_3^-$).

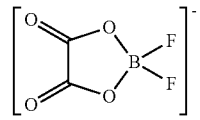 (5-1)

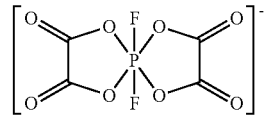 (5-2)

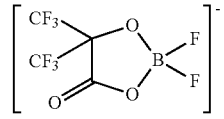 (5-3)

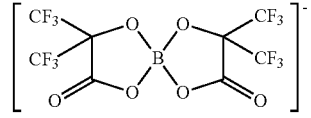 (5-4)

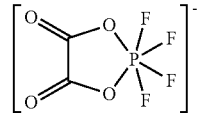 (5-5)

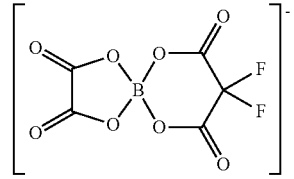 (6-1)

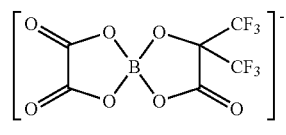 (6-2)

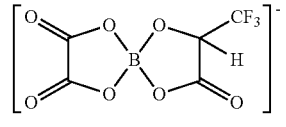 (6-3)

-continued (6-4)
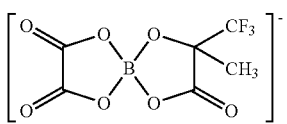

(6-5)
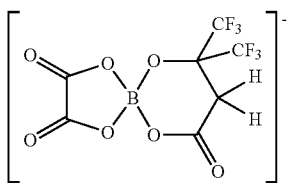

(6-6)
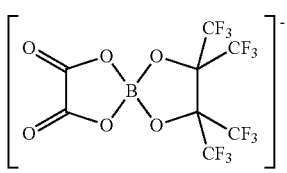

(6-7)
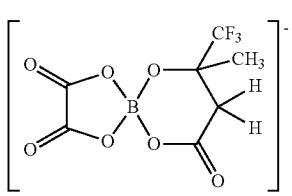

(6-8)
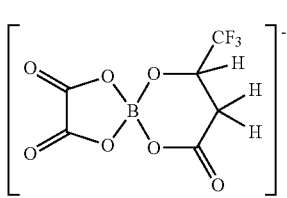

(7-1)
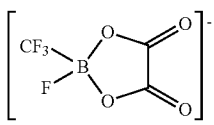

(9-1)
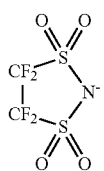

(9-2)
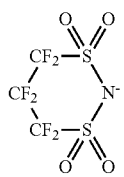

(9-3)
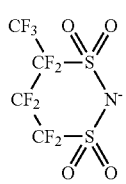

(9-4)
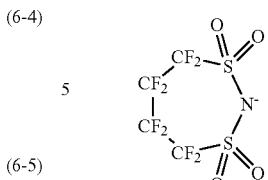

[12] The secondary battery according to any one of [1] to [11], wherein the lithium-oxygen-containing compound includes, as a constituent element, lithium (Li), oxygen (O), and one or more elements belonging to Groups 2 to 15 in long form of periodic table.

[13] The secondary battery according to [12], wherein the lithium-oxygen-containing compound includes one or more of compounds represented by respective Formulas (11) to (15), $$Li_{a1}Mn_{(1-b1-c1)}Ni_{b1}M1_{c1}O_{(2-d1)}F_{e1} \quad (11)$$

where M1 is one or more of cobalt (Co), magnesium (Mg), aluminum, boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), a1 to e1 satisfy $0.8 \leq a1 \leq 1.2$, $0 < b1 < 0.5$, $0 \leq c1 \leq 0.5$, $(b1+c1) < 1$, $-0.1 \leq d1 \leq 0.2$, and $0 \leq e1 \leq 0.1$, and a composition of lithium differs depending on a charged-discharged state, and a1 is a value in a completely-discharged state, $$Li_{a2}Ni_{(1-b2)}M2_{b2}O_{(2-c2)}F_{d2} \quad (12)$$

where M2 is one or more of cobalt, manganese (Mn), magnesium, aluminum, boron, titanium, vanadium, chromium, iron, copper, zinc, molybdenum, tin, calcium, strontium, and tungsten, a2 to d2 satisfy $0.8 \leq a2 \leq 1.2$, $0.005 \leq b2 \leq 0.5$, $-0.1 \leq c2 \leq 0.2$, and $0 \leq d2 \leq 0.1$, and a composition of lithium differs depending on the charged-discharged state, and a2 is a value in the completely-discharged state, $$Li_{a3}Co_{(1-b3)}M3_{b3}O_{(2-c3)}F_{d3} \quad (13)$$

where M3 is one or more of nickel (Ni), manganese, magnesium, aluminum, boron, titanium, vanadium, chromium, iron, copper, zinc, molybdenum, tin, calcium, strontium, and tungsten, a3 to d3 satisfy $0.8 \leq a3 \leq 1.2$, $0 \leq b3 < 0.5$, $-0.1 \leq c3 \leq 0.2$, and $0 \leq d3 \leq 0.1$, and a composition of lithium differs depending on the charged-discharged state, and a3 is a value in the completely-discharged state, $$Li_{a4}Mn_{(2-b4)}M4_{b4}O_{c4}F_{d4} \quad (14)$$

where M4 is one or more of cobalt, nickel, magnesium, aluminum, boron, titanium, vanadium, chromium, iron, copper, zinc, molybdenum, tin, calcium, strontium, and tungsten, a4 to d4 satisfy $0.9 \leq a4 \leq 1.1$, $0 \leq b4 \leq 0.6$, $3.7 \leq c4 \leq 4.1$, and $0 \leq d4 \leq 0.1$, and a composition of lithium differs depending on the charged-discharged state, and a4 is a value in the completely-discharged state, $$Li_{a5}M5PO_4 \quad (15)$$

where M5 is one or more of cobalt, manganese, iron, nickel, magnesium, aluminum, boron, titanium, vanadium, niobium (Nb), copper, zinc, molybdenum, calcium, strontium, tungsten, and zirconium (Zr),
    a5 satisfies $0.9 \leq a5 \leq 1.1$,
    a composition of lithium differs depending on the charged-discharged state, and a5 is a value in the completely-discharged state.
[14] The secondary battery according to [13], wherein
    the compounds represented by respective Formulas (11) to (13) each include one or more of $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$,
    the compound represented by Formula (14) includes $LiMn_2O_4$, and
    the compound represented by Formula (15) includes one or more of $LiFePO_4$, $LiMnPO_4$, $LiFe_{0.5}Mn_{0.5}PO_4$, and $LiFe_{0.3}Mn_{0.7}PO_4$.
[15] The secondary battery according to any one of [1] to [14], wherein the secondary battery is a lithium secondary battery.
[16] A battery pack including:
    the secondary battery according to any one of [1] to [15];
    a control section configured to control operation of the secondary battery; and
    a switch section configured to switch the operation of the secondary battery according to an instruction of the control section.
[17] An electric vehicle including:
    the secondary battery according to any one of [1] to [15];
    a conversion section configured to convert electric power supplied from the secondary battery into drive power;
    a drive section configured to operate according to the drive power; and
    a control section configured to control operation of the secondary battery.
[18] An electric power storage system including:
    the secondary battery according to any one of [1] to [15];
    one or more electric devices configured to be supplied with electric power from the secondary battery; and
    a control section configured to control the supplying of the electric power from the secondary battery to the one or more electric devices.
[19] An electric power tool including:
    the secondary battery according to any one of [1] to [15]; and
    a movable section configured to be supplied with electric power from the secondary battery,
[20] An electronic apparatus including the secondary battery according to any one of [1] to [15] as an electric power supply source.
    It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
    a cathode including a lithium-oxygen-containing compound;
    an anode; and
    non-aqueous electrolytic solution including one or more first anions represented by Formula (1) or Formula (1)', $$B(XY)xFyRz- \quad (1)$$

where X is one of a divalent chain hydrocarbon group and a divalent fluorinated chain hydrocarbon group, Y is a cyano group (—C≡N),
R is one of a monovalent fluorinated chain hydrocarbon group and a monovalent fluorinated cyclic hydrocarbon group, and
x to z are integers that satisfy $x=1$ or 2, $y \geq 1$, $z > 0$, $(x+y+z)=4$, and $(y+z) > 1$, $$B(XY)xFyRz- \quad (1)'$$

where X is one of a divalent chain hydrocarbon group, a divalent fluorinated chain hydrocarbon group, and nothing,
Y is an isocyano group (—N+≡C—),
R is one of a monovalent fluorinated chain hydrocarbon group and a monovalent fluorinated cyclic hydrocarbon group, and
x to z are integers that satisfy $x=1$ or 2, $y \geq 1$, $z \geq 0$, $(x+y+z)=4$, and $(y+z) \geq 1$.

2. The secondary battery according to claim 1, wherein
the divalent chain hydrocarbon group is an alkylene group,
the divalent fluorinated chain hydrocarbon group is a group obtained by substituting one or more fluorine groups (—F) for one or more hydrogen groups (—H) in the alkylene group,
the monovalent fluorinated chain hydrocarbon group is one of a group obtained by substituting one or more fluorine groups for one or more hydrogen groups in an alkyl group, a group obtained by substituting one or more fluorine groups for one or more hydrogen groups in an alkenyl group, and a group obtained by substituting one or more fluorine groups for one or more hydrogen groups in an alkynyl group, and
the monovalent fluorinated cyclic hydrocarbon group is one of a group obtained by substituting one or more fluorine groups for one or more hydrogen groups in an aryl group, and a group obtained by substituting one or more fluorine groups for one or more hydrogen groups in a cycloalkyl group.

3. The secondary battery according to claim 2, wherein
the alkylene group has carbon number from 1 to 4 both inclusive,
the alkyl group has carbon number from 1 to 4 both inclusive,
the alkenyl group and the alkynyl group each have carbon number from 2 to 4 both inclusive, and
the aryl group and the cycloalkyl group each have carbon number from 6 to 18 both inclusive.

4. The secondary battery according to claim 1, wherein
the divalent fluorinated chain hydrocarbon group is a perfluoroalkylene group,
the monovalent fluorinated chain hydrocarbon group is one of a perfluoroalkyl group, a perfluoroalkenyl group, and a perfluoroalkynyl group, and
the monovalent fluorinated cyclic hydrocarbon group is one of a perfluoroaryl group and a perfluorocycloalkyl group.

5. The secondary battery according to claim 1, wherein includes one or more of B(NC)2F(CF3)-, B(NC)F2(CF3)-, B(NC)F(CF3)2-, B(NC)2F(C2F5)-, B(NC)F2(C2F5)-, and B(NC)F(C2F5)2-.

6. The secondary battery according to claim 1, wherein the non-aqueous electrolytic solution includes alkali metal ion, alkaline-earth metal ion, or both as a cation.

7. The secondary battery according to claim 6, wherein the cation includes lithium ion (Li+).

8. The secondary battery according to claim 1, wherein
the non-aqueous electrolytic solution includes one or more second anions excluding the first anions, and
the one or more second anions each include fluorine (F) as a constituent element.

9. The secondary battery according to claim 8, wherein
the one or more second anions include one or more of hexafluorophosphate ion (PF6-), tetrafluoroborate ion (BF4-), hexafluoroarsenate ion (AsF6-), trifluoromethanesulfonic acid ion (CF3SO3-), hexafluorosilicate ion (Li2SiF6-), bis(fluorosulfonyl)imide ion (N(FSO2)2-), and ions represented by respective Formulas (5) to (10),

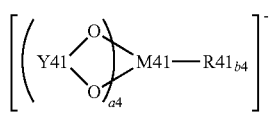  (5)

where M41 is one of transition metal elements, Group 13 elements, Group 14 elements, and Group 15 elements in long form of periodic table,
R41 is a halogen group,
Y41 is one of —C(=O)—R42-C(=O)—, —C(=O)—CR432-, and —C(=O)—C(=O)—,
R42 is one of an alkylene group, a halogenated alkylene group, an arylene group, and a halogenated arylene group,
R43 is one of an alkyl group, a halogenated alkyl group, an aryl group, and a halogenated aryl group,
a4 is an integer from 1 to 4 both inclusive, and
b4 is an integer of one of 0, 2, and 4,

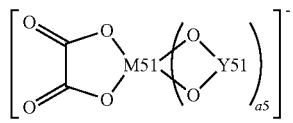  (6)

where X51 is one of Group 1 elements and Group 2 elements in the long form of the periodic table,
M51 is one of transition metal elements, Group 13 elements, Group 14 elements, and Group 15 elements in the long form of the periodic table,
Y51 is one of —C(=O)—(CR512)b5-C(=O)—, —R532C—(CR522)c5-C(=O)—, —R532C—(CR522)c5-CR532-, —R532C—(CR522)c5-S(=O)2-, —S(=O)2-(CR522)d5-S(=O)2-, and —C(=O)—(CR522)d5-S(=O)2,
R51 and R53 are each one of a hydrogen group, an alkyl group, a halogen group, and a halogenated alkyl group,
R51, R53, or both are each one of a halogen group and a halogenated alkyl group,
R52 is one of a hydrogen group, an alkyl group, a halogen group, and a halogenated alkyl group, and
a5 is an integer of one of 1 and 2,

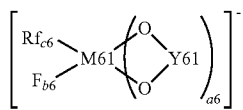  (7)

where X61 is one of Group 1 elements and Group 2 elements in the long form of the periodic table, M61 is one of transition metal elements, Group 13 elements, Group 14 elements, and Group 15 elements in the long form of the periodic table,
Rf is one of a fluorinated alkyl group and a fluorinated aryl group, and has carbon number from 1 to 10 both inclusive,
Y61 is one of —C(=O)—(CR612)d6-C(=O)—, —R622C—(CR612)d6-C(=O)—, —R622C—(CR612)d6-CR622-, —R622C—(CR612)d6-S(=O)2-, —S(=O)2-(CR612)e6-S(=O)2-, and —C(=O)—(CR612)e6-S(=O)2-,
R61 is one of a hydrogen group, an alkyl group, a halogen group, and a halogenated alkyl group,
R62 is one of a hydrogen group, an alkyl group, a halogen group, and a halogenated alkyl group,
at least one of R62s is one of the halogen group and the halogenated alkyl group,
a6 is an integer of one of 1 and 2, and
b6 and c6 are each an integer from 1 to 4 both inclusive, N(C$m$F$2m+1$SO2)(C$n$F$2n+1$SO2)-  (8)

where m and n are each an integer of 1 or larger,

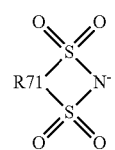  (9)

where R71 is a linear or branched perfluoroalkylene group having carbon number from 2 to 4 both inclusive, C(C$p$F$2p+1$SO2)(C$q$F$2q+1$SO2)(C$r$F$2r+1$SO2)-  (10)

where p, q, and r are each an integer of 1 or larger.

10. The secondary battery according to claim 9, wherein
the anion represented by Formula (5) includes one or more of anions represented by respective Formulas (5-1) to (5-5),
the anion represented by Formula (6) includes one or more of anions represented by respective Formulas (6-1) to (6-8),
the anion represented by Formula (7) includes an anion represented by Formula (7-1),
the anion represented by Formula (8) includes one or more of bis (trifluoromethanesulfonyl) imide ion (N(CF3 SO2)2-), bis (pentafluoroethanesulfonyl) imide ion (N(C2F5SO2)2-), (trifluoromethanesulfonyl) fluoroethanesulfonyl) (pentafluoroethanesulfonyl) imide ion (N(CF3SO2)(C2F5SO2)-), (trifluoromethanesulfonyl) (heptafluoropropanesulfonyl) imide ion (N(CF3SO2)(C3F7SO2)-), and (trifluoromethanesulfonyl) (nonafluorobutanesulfonyl) imide ion (N(CF3SO2)(C4F9SO2)-),
the anion represented by Formula (9) includes one or more anions represented by respective Formulas (9-1) to (9-4), and
the anion represented by Formula (10) includes tris (trifluoromethanesulfonyl) methide ion (C(CF3SO2)3-).

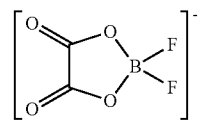  (5-1)

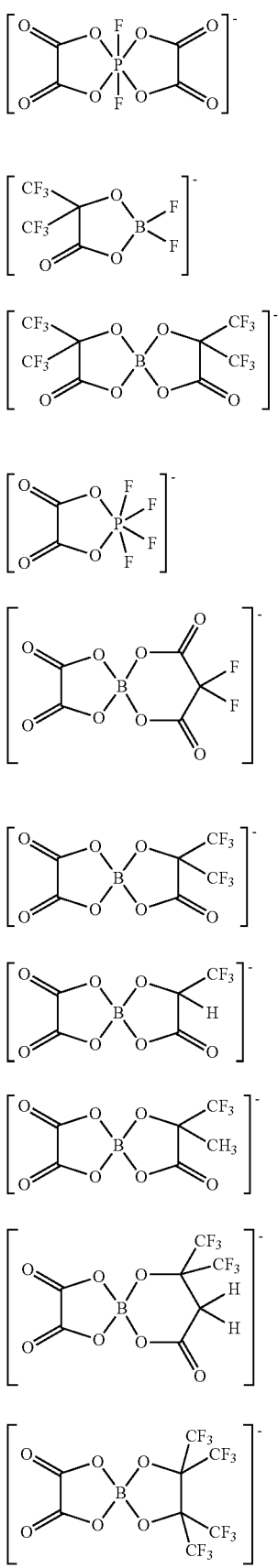

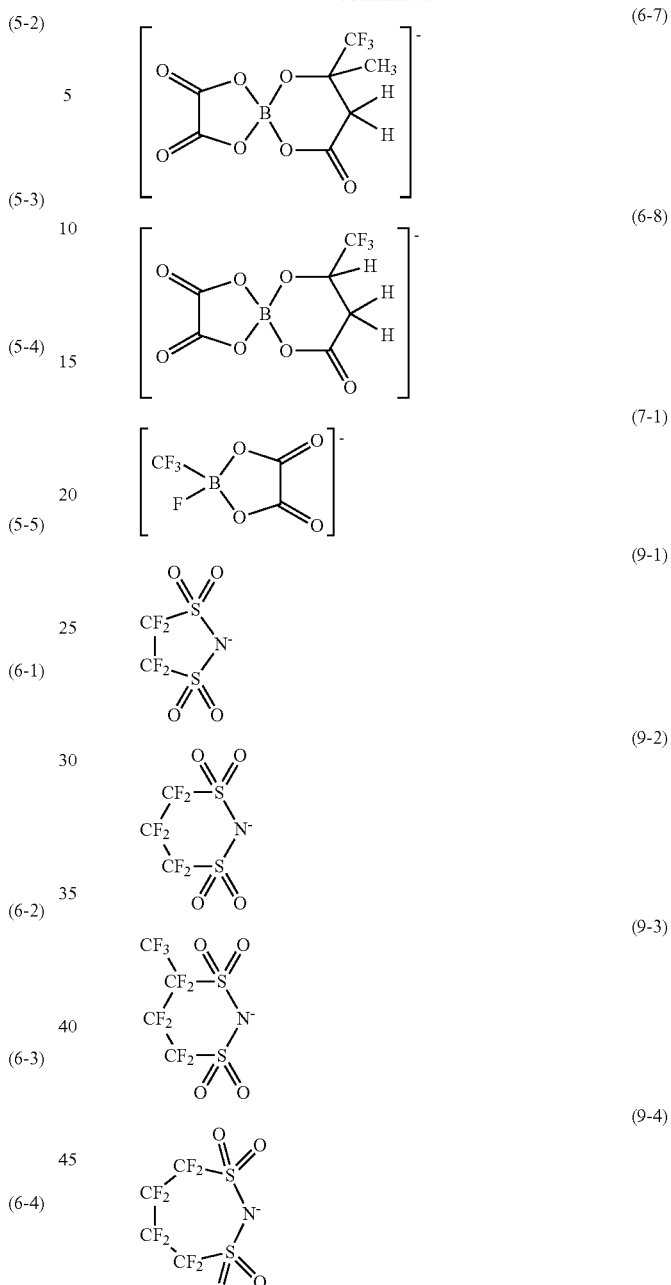

11. The secondary battery according to claim 1, wherein the lithium-oxygen-containing compound includes, as a constituent element, lithium (Li), oxygen (O), and one or more elements belonging to Groups 2 to 15 in long form of periodic table.

12. The secondary battery according to claim 11, wherein the lithium-oxygen-containing compound includes one or more of compounds represented by respective Formulas (11) to (15), $$Li_{a1}Mn_{(1-b1-c1)}Ni_{b1}M1_{c1}O_{(2-d1)}Fe_1 \qquad (11)$$

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), a1 to e1 satisfy $0.8 \leq a1 \leq 1.2$, $0 < b1 < 0.5$, $0 \leq c1 \leq 0.5$, $(b1+c1) < 1$, $-0.1 \leq d1 \leq 0.2$, and $0 \leq e1 \leq 0.1$, and a composition of lithium differs depending on a charged-discharged state, and a1 is a value in a completely-discharged state, $$\text{Li}_{a2}\text{Ni}_{(1-b2)}\text{M2}_{b2}\text{O}_{(2-c2)}\text{F}_{d2} \quad (12)$$

where M2 is one or more of cobalt, manganese (Mn), magnesium, aluminum, boron, titanium, vanadium, chromium, iron, copper, zinc, molybdenum, tin, calcium, strontium, and tungsten, a2 to d2 satisfy $0.8 \leq a2 \leq 1.2$, $0.005 \leq b2 \leq 0.5$, $-0.1 \leq c2 \leq 0.2$, and $0 \leq d2 \leq 0.1$, and a composition of lithium differs depending on the charged-discharged state, and a2 is a value in the completely-discharged state, $$\text{Li}_{a3}\text{Co}_{(1-b3)}\text{M3}_{b3}\text{O}_{(2-c3)}\text{F}_{d3} \quad (13)$$

where M3 is one or more of nickel (Ni), manganese, magnesium, aluminum, boron, titanium, vanadium, chromium, iron, copper, zinc, molybdenum, tin, calcium, strontium, and tungsten, a3 to d3 satisfy $0.8 \leq a3 \leq 1.2$, $0 \leq b3 < 0.5$, $-0.1 \leq c3 \leq 0.2$, and $0 \leq d3 \leq 0.1$, and a composition of lithium differs depending on the charged-discharged state, and a3 is a value in the completely-discharged state, $$\text{Li}_{a4}\text{Mn}_{(2-b4)}\text{M4}_{b4}\text{O}_{c4}\text{F}_{d4} \quad (14)$$

where M4 is one or more of cobalt, nickel, magnesium, aluminum, boron, titanium, vanadium, chromium, iron, copper, zinc, molybdenum, tin, calcium, strontium, and tungsten, a4 to d4 satisfy $0.9 \leq a4 \leq 1.1$, $0 \leq b4 \leq 0.6$, $3.7 \leq c4 \leq 4.1$, and $0 \leq d4 \leq 0.1$, and a composition of lithium differs depending on the charged-discharged state, and a4 is a value in the completely-discharged state, $$\text{Li}_{a5}\text{M5PO}_4 \quad (15)$$

where M5 is one or more of cobalt, manganese, iron, nickel, magnesium, aluminum, boron, titanium, vanadium, niobium (Nb), copper, zinc, molybdenum, calcium, strontium, tungsten, and zirconium (Zr), a5 satisfies $0.9 \leq a5 \leq 1.1$, a composition of lithium differs depending on the charged-discharged state, and a5 is a value in the completely-discharged state.

13. The secondary battery according to claim 12, wherein
the compounds represented by respective Formulas (11) to (13) each include one or more of LiNiO2, LiCoO2, LiCo0.98Al0.01Mg0.01O2, LiNi0.5 Co0.2Mn0.3O2, LiNi0.8Co0.15Al0.05O2, LiNi0.33Co0.33Mn0.33O2, Li1.2Mn0.52Co0.175Ni0.1O2, and Li1.15 (Mn0.65Ni0.22Co0.13)O2, the compound represented by Formula (14) includes LiMn2O4, and the compound represented by Formula (15) includes one or more of LiFePO4, LiMnPO4, LiFe0.5Mn0.5PO4, and LiFe0.3Mn0.7PO4.

14. The secondary battery according to claim 1, wherein the secondary battery is a lithium secondary battery.

15. A battery pack comprising:
a secondary battery;
a control section configured to control operation of the secondary battery; and
a switch section configured to switch the operation of the secondary battery according to an instruction of the control section, the secondary battery including
a cathode including a lithium-oxygen-containing compound,
an anode, and
non-aqueous electrolytic solution including one or more first anions represented by Formula (1) or Formula (1)', $$\text{B}(XY)_x\text{F}_y\text{R}_z- \quad (1)$$

where X is one of a divalent chain hydrocarbon group and a divalent fluorinated chain hydrocarbon group,
Y is a cyano group ($-C\equiv N$),
R is one of a monovalent fluorinated chain hydrocarbon group and a monovalent fluorinated cyclic hydrocarbon group, and
x to z are integers that satisfy $x=1$ or 2, $y \geq 1$, $z > 0$, $(x+y+z)=4$, and $(y+z) > 1$, $$\text{B}(XY)_x\text{F}_y\text{R}_z- \quad (1)'$$

where X is one of a divalent chain hydrocarbon group, a divalent fluorinated chain hydrocarbon group, and nothing,
Y is an isocyano group ($-N+\equiv C-$),
R is one of a monovalent fluorinated chain hydrocarbon group and a monovalent fluorinated cyclic hydrocarbon group, and
x to z are integers that satisfy $x=1$ or 2, $y \geq 1$, $z \geq 0$, $(x+y+z)=4$, and $(y+z) \geq 1$.

16. An electric vehicle comprising:
a secondary battery;
a conversion section configured to convert electric power supplied from the secondary battery into drive power;
a drive section configured to operate according to the drive power; and
a control section configured to control operation of the secondary battery, the secondary battery including
a cathode including a lithium-oxygen-containing compound,
an anode, and
non-aqueous electrolytic solution including one or more first anions represented by Formula (1) or Formula (1)', $$\text{B}(XY)_x\text{F}_y\text{R}_z- \quad (1)$$

where X is one of a divalent chain hydrocarbon group and a divalent fluorinated chain hydrocarbon group,
Y is a cyano group ($-C\equiv N$),
R is one of a monovalent fluorinated chain hydrocarbon group and a monovalent fluorinated cyclic hydrocarbon group, and
x to z are integers that satisfy $x=1$ or 2, $y \geq 1$, $z > 0$, $(x+y+z)=4$, and $(y+z) \geq 1$, $$(XY)_x\text{F}_y\text{R}_z- \quad (1)'$$

where X is one of a divalent chain hydrocarbon group, a divalent fluorinated chain hydrocarbon group, and nothing,
Y is an isocyano group ($-N+\equiv C-$),
R is one of a monovalent fluorinated chain hydrocarbon group and a monovalent fluorinated cyclic hydrocarbon group, and
x to z are integers that satisfy $x=1$ or 2, $y \geq 1$, $z \geq 0$, $(x+y+z)=4$, and $(y+z) \geq 1$.

17. An electric power storage system comprising:
a secondary battery;
one or more electric devices configured to be supplied with electric power from the secondary battery; and
a control section configured to control the supplying of the electric power from the secondary battery to the one or more electric devices,
the secondary battery including
a cathode including a lithium-oxygen-containing compound,
an anode, and
non-aqueous electrolytic solution including one or more first anions represented by Formula (1) or Formula (1)', $$B(XY)_x F_y R_z- \qquad (1)$$

where X is one of a divalent chain hydrocarbon group and a divalent fluorinated chain hydrocarbon group,
Y is a cyano group (—C≡N),
R is one of a monovalent fluorinated chain hydrocarbon group and a monovalent fluorinated cyclic hydrocarbon group, and
x to z are integers that satisfy x=1 or 2, y≥1, z>0, (x+y+z)=4, and (y+z)>1, $$B(XY)_x F_y R_z- \qquad (1)'$$

where X is one of a divalent chain hydrocarbon group, a divalent fluorinated chain hydrocarbon group, and nothing,
Y is an isocyano group (—N+≡C—),
R is one of a monovalent fluorinated chain hydrocarbon group and a monovalent fluorinated cyclic hydrocarbon group, and
x to z are integers that satisfy x=1 or 2, y≥1, z≥0, (x+y+z)=4, and (y+z)≥1.

* * * * *